United States Patent
Tang

(10) Patent No.: US 10,410,019 B2
(45) Date of Patent: Sep. 10, 2019

(54) AUTOMATED SYSTEM AND METHOD FOR CONSTRUCTING CARD MULTIPACKS, AND CARD MULTIPACK CONSTRUCTED USING THE SAME

(71) Applicant: Harvard Label LLC, Wilmington, DE (US)

(72) Inventor: Michael Tang, Monterey Park, CA (US)

(73) Assignee: Harvard Label, LLC, Wilmington, DE (US)

(*) Notice: Subject to any disclaimer, the term of this patent is extended or adjusted under 35 U.S.C. 154(b) by 0 days.

(21) Appl. No.: 16/248,201

(22) Filed: Jan. 15, 2019

(65) Prior Publication Data

US 2019/0147198 A1 May 16, 2019

Related U.S. Application Data

(63) Continuation of application No. 15/636,172, filed on Jun. 28, 2017, now Pat. No. 10,248,816.

(Continued)

(51) Int. Cl.
| | |
|---|---|
| *G06K 1/12* | (2006.01) |
| *B65B 13/18* | (2006.01) |
| *G06K 7/14* | (2006.01) |
| *B65B 35/18* | (2006.01) |
| *B65B 51/32* | (2006.01) |
| *B65B 61/02* | (2006.01) |
| *B65B 63/00* | (2006.01) |
| *B65B 5/10* | (2006.01) |
| *B65B 7/28* | (2006.01) |

(52) U.S. Cl.
CPC .............. *G06K 1/121* (2013.01); *B65B 5/105* (2013.01); *B65B 7/2807* (2013.01); *B65B 7/2878* (2013.01); *B65B 13/185* (2013.01); *B65B 35/18* (2013.01); *B65B 51/32* (2013.01); *B65B 61/025* (2013.01); *B65B 63/005* (2013.01); *G06K 7/1439* (2013.01)

(58) Field of Classification Search
CPC ........... G06K 7/10722; G06K 7/10861; G06K 7/1439; G06K 1/121; B65B 11/50
USPC ..... 235/475, 478, 479, 483, 462.01, 462.14, 235/462.41
See application file for complete search history.

(56) References Cited

U.S. PATENT DOCUMENTS 5,033,725 A * 7/1991 Van Duursen ............ B07C 1/00
270/52.02
5,388,815 A * 2/1995 Hill ........................ B42D 5/027
270/32

(Continued)

*Primary Examiner* — Paultep Savusdiphol
(74) *Attorney, Agent, or Firm* — Brown Rudnick LLP

(57) ABSTRACT

Automated systems, methods for constructing card multipacks, and a card multipack constructing using the same are provided. An automated system for constructing card multipacks includes: a movable conveyor including a plurality of tooling plates, each configured to receive a height adjusting member; a first carrier placing station configured to place a first carrier portion of a carrier on a tooling plate of the plurality of tooling plates; a first card placing station configured to place a first stored value card on the first carrier portion; a first data capture station configured to read a first card bar code of the first stored value card in-line in the automated system; and a software system adapted to verify the first card bar code with a data file.

20 Claims, 23 Drawing Sheets

Related U.S. Application Data

(60) Provisional application No. 62/357,859, filed on Jul. 1, 2016.

(56) References Cited

U.S. PATENT DOCUMENTS

| | | | | |
|---|---|---|---|---|
| 5,433,364 A * | 7/1995 | Hill | ............ | B43M 3/045 |
| | | | | 225/96 |
| 5,509,886 A * | 4/1996 | Hill | ............ | B42D 5/027 |
| | | | | 493/419 |
| 5,777,305 A * | 7/1998 | Smith | ............ | G06Q 20/3437 |
| | | | | 235/380 |
| 5,862,979 A * | 1/1999 | Hill | ............ | B42D 5/027 |
| | | | | 229/92.1 |
| 5,918,909 A * | 7/1999 | Fiala | ............ | B42D 15/00 |
| | | | | 283/61 |
| 5,923,015 A * | 7/1999 | Hill | ............ | B42D 5/027 |
| | | | | 235/380 |
| 6,142,376 A * | 11/2000 | Cherry | ............ | G06K 7/10861 |
| | | | | 198/502.1 |
| 6,328,341 B2 * | 12/2001 | Klure | ............ | B42D 15/025 |
| | | | | 206/454 |
| 6,550,224 B2 | 4/2003 | Kleinschmidt | | |
| 6,846,278 B1 * | 1/2005 | Hill | ............ | B65H 45/14 |
| | | | | 493/419 |
| 6,957,737 B1 * | 10/2005 | Frederickson | ..... | G06Q 20/3437 |
| | | | | 206/449 |
| 7,036,723 B1 * | 5/2006 | Hill | ............ | B42D 5/027 |
| | | | | 235/380 |
| 7,063,255 B2 * | 6/2006 | Algiene | ............ | G06Q 20/403 |
| | | | | 235/380 |
| 7,118,042 B2 * | 10/2006 | Moore | ............ | G06K 7/10861 |
| | | | | 235/462.48 |
| 7,308,784 B2 | 12/2007 | Appelbaum et al. | | |
| 7,341,190 B2 * | 3/2008 | Moore | ............ | G06K 7/10861 |
| | | | | 235/454 |
| 7,354,004 B2 | 4/2008 | Andersen et al. | | |
| 7,740,170 B2 * | 6/2010 | Singh | ............ | G06Q 20/20 |
| | | | | 235/380 |
| 8,256,682 B2 * | 9/2012 | Chakiris | ............ | B42D 15/045 |
| | | | | 235/380 |
| 8,370,205 B2 * | 2/2013 | Arthur | ............ | G06Q 20/20 |
| | | | | 705/17 |
| 8,640,949 B2 | 2/2014 | Biskupski et al. | | |
| 8,777,110 B2 | 7/2014 | Biskupski et al. | | |
| 2002/0059783 A1 * | 5/2002 | Kleinschmidt | ............ | B65B 11/50 |
| | | | | 53/453 |
| 2003/0146285 A1 * | 8/2003 | Moore | ............ | G06K 7/10861 |
| | | | | 235/462.48 |
| 2004/0108374 A1 * | 6/2004 | Greene | ............ | G07B 17/00459 |
| | | | | 235/375 |
| 2004/0111348 A1 * | 6/2004 | Greene | ............ | G06Q 20/355 |
| | | | | 705/36 R |
| 2005/0150942 A1 * | 7/2005 | Greene, III | ............ | G06Q 10/06 |
| | | | | 235/375 |
| 2006/0261154 A1 * | 11/2006 | Arthur | ............ | G06Q 20/20 |
| | | | | 235/380 |
| 2007/0045404 A1 * | 3/2007 | Andersen | ............ | G06Q 10/0875 |
| | | | | 235/380 |
| 2007/0084744 A1 * | 4/2007 | Appelbaum | ............ | B65B 7/26 |
| | | | | 206/462 |
| 2008/0114696 A1 * | 5/2008 | Singh | ............ | G06Q 20/20 |
| | | | | 705/66 |
| 2008/0217415 A1 * | 9/2008 | Royer | ............ | G06Q 20/342 |
| | | | | 235/493 |
| 2009/0218392 A1 * | 9/2009 | Biskupski | ............ | B65D 73/0014 |
| | | | | 235/375 |
| 2009/0218408 A1 * | 9/2009 | Biskupski | ............ | B65D 73/0028 |
| | | | | 235/493 |
| 2009/0283594 A1 * | 11/2009 | Walton | ............ | G06Q 30/02 |
| | | | | 235/383 |
| 2010/0219099 A1 * | 9/2010 | Schmitt | ............ | B65D 75/305 |
| | | | | 206/776 |
| 2012/0234909 A1 * | 9/2012 | Tang | ............ | B65B 11/50 |
| | | | | 235/375 |

* cited by examiner

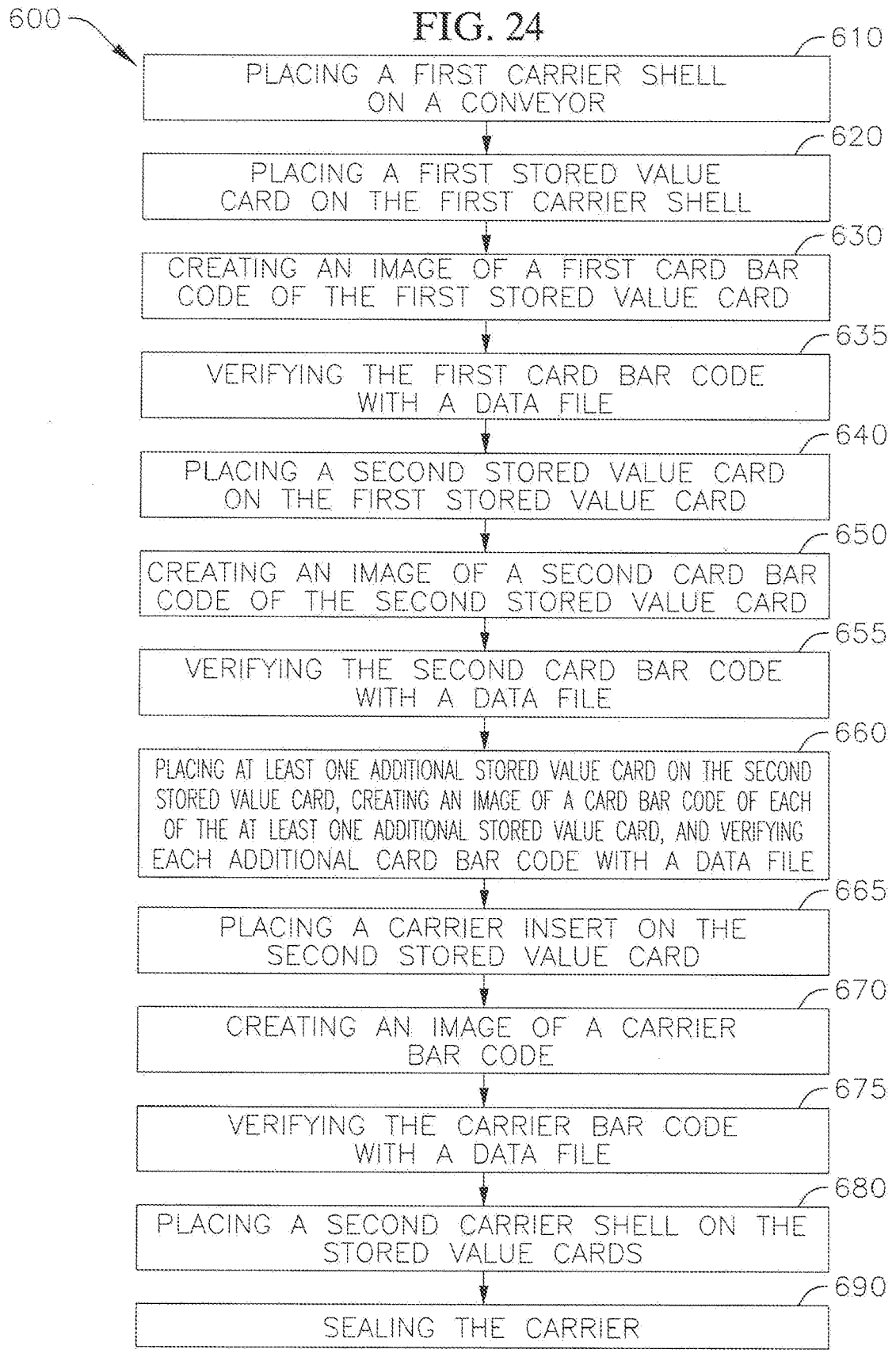

AUTOMATED SYSTEM AND METHOD FOR CONSTRUCTING CARD MULTIPACKS, AND CARD MULTIPACK CONSTRUCTED USING THE SAME

CROSS-REFERENCE TO RELATED APPLICATION

This application is a continuation of U.S. patent application Ser. No. 15/636,172, filed on Jun. 28, 2017, which claims priority to U.S. Provisional Patent Application Ser. No. 62/357,859, filed on Jul. 1, 2016, each of which is hereby incorporated by reference in its entirety.

FIELD

Aspects of embodiments of the present invention relate to card multipacks, and more particularly, to automated systems and methods for constructing card multipacks, and a card multipack constructed using the same.

BACKGROUND

Stored value cards distributed, for example, by financial institutions, telephone companies, or other providers of goods and services are typically forwarded to retail merchants for sale to individual purchasers. These stored value cards allow the holder prepaid access to existing phone networks for making phone calls, for example, eliminating the need to carry cash on hand. Additionally, stored value cards may be used to provide authorization for the rental or purchase of goods and services, or may be used as a gift certificate granting the holder credit for various goods and services.

Stored value cards are typically purchased by merchants similar to any other good, and displayed for sale in the merchants' stores. In order to reduce their exposure to the loss of the valuable cards through theft or fraud, it is typically the practice for merchants to sell non-activated, or "zero balance" stored value cards which have no intrinsic value until they are activated by the merchant's magnetic, bar code, and/or radio-frequency card reader. It is now a common practice to sell such cards to purchasers with the activation taking place at the merchant counter at the time of sale. Moreover, as a result of this practice, the merchant reduces his overhead because the value of the inactivated stored value cards is not payable to the wholesale vendor of the cards until the card itself is actually distributed by the merchant at the point of sale.

Stored value cards are often sold mounted in or on some sort of card carrier and/or protective display package. These cards, however, may still be susceptible to theft and/or fraud due to tampering. For example, the confidential code may be pre-accessed by a malicious person such that the purchased value of the unsuspecting legitimate purchaser may be later stolen. In order to reduce the chance of theft or fraud, it is typically the practice that a stored value card is not activated until purchase. That is, upon sale of a stored value card to a purchaser, the merchant electronically activates the stored value card with a specific balance paid for by the purchaser, and the purchaser may utilize the stored value using a confidential code provided in the card. Additionally, a database containing activation codes and balance data is typically maintained by a processing company, which is notified electronically by the merchant when the card has been activated. Alternatively, the processing company may perform the activation of the card upon receiving an electronic message from the merchant that the particular card has been purchased.

In the purchasing of stored value cards, it is often desirable to purchase more than one card in a single purchase. As such, stored value card multipacks (i.e. display packages containing multiple cards) have been created. Such multipacks allow a purchaser to purchaser more than one card in a single purchase, such as several cards each having a relatively low redemption value as opposed to a single card having a high value. However, there are additional complexities in the packaging, activation, data-keeping, and fraud protection of such stored value card multipacks, and one or more of these tasks is typically performed manually during the manufacturing of the stored value card multipacks which may enable fraud and theft at the manufacturing stage. Further, while stored value card multipacks have been manufactured with data printed on an inside surface of the packaging, such data has been packaging inventory control data that was not used in automating the manufacturing of the stored value card multipacks.

As discussed above, fraud and theft is a common problem associated with stored value cards and, unfortunately, may occur during the manufacturing and/or packaging of the cards. For example, it is possible that the bar codes of the individual cards may be copied and produced on duplicate cards. As such, there is a need for a system that reduces fraud and theft during manufacturing and packaging of stored value cards, including stored value card multipacks. Additionally, there is a need to provide a stored value card with a high degree of fraud protection so that it can be readily observed if the card has been tampered with.

SUMMARY

According to an aspect of embodiments of the present invention, an automated packaging apparatus is configured to sequentially place cards, such as gift cards or debit cards, of a plurality of cards into a card package (i.e. a multipack). According to aspects of embodiments of the present invention, systems, apparatuses, and methods for constructing a card multipack reduce manual handling and packaging errors, packaging time and cost, and opportunity for fraud and theft.

According to another aspect of embodiments of the present invention, an automated system for constructing card multipacks is configured to read bar codes from stored value cards, compare and verify the bar codes with predetermined codes of a data file, and package and seal the stored value cards in the card multipacks, each being performed in-line in the automated system without human interaction. According to an aspect of embodiments of the present invention, an automated system for constructing card multipacks is configured to read at least one card bar code in-line from at least one stored value card and a carrier bar code from a corresponding carrier, to compare and verify the at least one card bar code and the carrier bar code with predetermined codes of a data file linking, or associating, the at least one card bar code and the corresponding carrier bar code, and to package and seal the at least one stored value card together with the corresponding carrier to form a card multipack. According to an aspect of embodiments of the present invention, an automated system for constructing card multipacks is configured to read card bar codes in-line from a plurality of stored value cards, to compare and verify the plurality of card bar codes with predetermined codes of a data file, that is, by a process of bicapture or in-line compare, and to package and seal the plurality of stored value cards to form a card multipack. The card bar codes may be linked or associated with a carrier bar code, which may also be read and verified in-line, or the card bar codes may include a parent card bar code linked or associated with at least one child card bar code.

According to another aspect of embodiments of the present invention, an automated system for constructing card multipacks is configured to sequentially place on a carrier a plurality of stored value cards, while reading and verifying a card bar code of each of the plurality of stored value cards with a respective predetermined code of a data file in-line before a next one of the stored value cards is stacked on the previous one of the stored value cards, and to package and seal the plurality of stored value cards to form a card multipack.

According to another aspect of embodiments of the present invention, a card multipack for packaging a plurality of stored value cards is compact due to the stored value cards being stacked and overlapped with one another.

According to another aspect of embodiments of the present invention, a method of constructing a card multipack reduces manual handling and verification with a database, packaging errors, and fraud. A method of constructing a card multipack includes automatically reading card bar codes from stored value cards and carrier bar codes, automatically verifying the card bar codes with predetermined codes of a data file linking, or associating, the card bar codes to corresponding carrier bar codes, and packaging the stored value cards together with the corresponding carriers to form card multipacks. According to one aspect, the method includes packaging a plurality of the stored value cards in each of the card multipacks. According to an aspect of embodiments of the present invention, an automated system and method is provided for packaging a plurality of stored value cards in-line in the automated system for any style of carrier or package containing any number of stored value cards.

According to one embodiment of the present invention, an automated system for constructing card multipacks includes: a movable conveyor including a plurality of tooling plates, each configured to receive a height adjusting member; a first carrier placing station configured to place a first carrier portion of a carrier on a tooling plate of the plurality of tooling plates; a first card placing station configured to place a first stored value card on the first carrier portion; a first data capture station configured to read a first card bar code of the first stored value card in-line in the automated system; and a software system adapted to verify the first card bar code with a data file.

In one embodiment, the first data capture station comprises a first camera configured to create a first image of the first card bar code, and the software system is adapted to verify the first card bar code using the first image.

In one embodiment, the automated system further includes another data capture station configured to read a carrier bar code of the carrier, wherein the software system is further adapted to verify the carrier bar code with the data file. The automated system may further include a second carrier placing station between the first data capture station and the another data capture station, the second carrier placing station configured to place a second carrier portion of the carrier on the first stored value card subsequent to the first data capture station reading the first card bar code, the second carrier portion including the carrier bar code.

In one embodiment, the automated system further includes: a second card placing station configured to place a second stored value card on the first carrier portion subsequent to the first data capture station reading the first card bar code; and a second data capture station configured to read a second card bar code of the second stored value card in-line in the automated system, and the software system is further adapted to verify the second card bar code with the data file. The second data capture station may include a second camera configured to create a second image of the second card bar code, and the software system may be adapted to verify the second card bar code using the second image. The second card placing station may be configured to place the second stored value card on the first stored value card such that the second stored value card at least partially covers the first card bar code.

In one embodiment, the automated system further includes a sealing station configured to seal the carrier, and the first data capture station is configured to read the first card bar code between the first card placing station and the sealing station. The software system may be adapted to verify the first card bar code in-line in the automated system and provide an output before the sealing station seals the carrier. The height adjusting portion may be configured to support the first carrier portion and adjust a height of the carrier to seal the carrier.

In one embodiment, the first carrier placing station is further configured to place another first carrier portion of another carrier on the conveyor, the first card placing station is further configured to place another first stored value card on the another first carrier portion, the first data capture station is further configured to read another first card bar code of the another first stored value card in-line in the automated system, and the software system is further adapted to verify the another first card bar code with the data file. Each of the plurality of tooling plates may be configured to support the first carrier portion and the another first carrier portion.

In one embodiment, the software system is further adapted to create another data file including information of the first card bar code.

In one embodiment, the system includes a plurality of card placing stations configured to sequentially place a plurality of stored value cards on the carrier.

In one embodiment, the data capture stations are configured to read the card bar codes and the software system is configured to verify the codes with the data file in-line in the automated system without human interaction.

In one embodiment, the card multipacks are gift card multipacks.

In one embodiment, the system further includes a second carrier placing station between the first carrier placing station and the at least one card placing station, the second carrier placing station being configured to place a first carrier shell of the carrier on the first carrier portion such that a recessed portion of the first carrier shell protrudes through an opening of the first carrier portion. In one embodiment, the system further includes a third carrier placing station between the at least one card placing station and a sealing station for sealing the card multipack, the third carrier placing station being configured to place a second carrier portion of the carrier over the first carrier shell and the at least one stored value card.

According to another embodiment of the present invention, a software system for use with an automated system for constructing card multipacks is adapted to compare and verify a plurality of card bar codes of a plurality of stored value cards in-line in the automated system using a data file including the plurality of card bar codes.

In one embodiment, the software system is further adapted to create another data file including information of the plurality of card bar codes. In one embodiment, the software system is further adapted to output a warning of non-verification of a card bar code of the plurality of card bar codes.

According to another embodiment of the present invention, a card multipack includes: a carrier; a first stored value card supported on the carrier and including a first card bar code; and a second stored value card supported on the carrier such that the second stored value card at least partially covers the first card bar code, the second stored value card including a second card bar code.

According to another embodiment of the present invention, a method of constructing a card multipack using an automated system includes: placing a first carrier portion of a carrier on a conveyor of the automated system using a first carrier placing station of the automated system, the conveyor including a plurality of tooling plates, each configured to receive a height adjusting member; placing a plurality of stored value cards on the first carrier portion using at least one card placing station of the automated system; reading a plurality of card bar codes of the plurality of stored value cards in-line using a data capture station of the automated system; and creating a data file including the card bar codes using a software system of the automated system.

In one embodiment, the method further includes: reading a carrier bar code of the carrier in-line using another data capture station of the automated system; and verifying the carrier bar code with the data file using the software system of the automated system.

In one embodiment, the method further includes: placing a second stored value card on the first carrier portion using a second card placing station of the automated system subsequent to reading the first card bar code; reading a second card bar code of the second stored value card in-line using a second data capture station of the automated system; and verifying the second card bar code with the data file using the software system of the automated system. Placing the second stored value card on the first carrier portion may include placing the second stored value card on the first stored value card such that the second stored value card at least partially covers the first card bar code.

In one embodiment, reading the first card bar code may include creating an image of the first card bar code using a first camera.

In one embodiment, the method further includes sealing the card multipack in-line using the automated system subsequent to verifying the first card bar code.

In one embodiment, reading the card bar codes and reading the carrier bar code are performed subsequent to placing the stored value cards on the first carrier portion, and the method further includes sealing the card multipack subsequent to reading the card bar codes and reading the carrier bar code.

In one embodiment, reading each of the card bar codes includes creating an image of each of the card bar codes using a respective camera, and reading the carrier bar code includes creating an image of the carrier bar code using another camera. The method may further include placing a second carrier portion including the carrier bar code on the stored value cards using a second carrier placing station of the automated system subsequent to reading the card bar codes and prior to reading the carrier bar code.

In one embodiment, the method further includes sealing the card multipack in-line using the automated system.

In one embodiment, placing a plurality of stored value cards on the carrier includes sequentially placing the plurality of stored value cards on the carrier. The method may further include placing an adhesive on at least one stored value card (e.g., on each of the stored value cards) of the plurality of stored value cards.

In one embodiment, the method further includes placing a first carrier shell on the first carrier portion such that a recessed portion of the first carrier shell protrudes through an opening of the first carrier portion, and placing the stored value cards on the carrier includes placing the stored value cards in the recessed portion of the first carrier shell. The method may further include placing a second carrier portion on the stored value cards over the first carrier shell prior to sealing the card multipack.

Placing the stored value cards on the carrier may include utilizing a vacuum device. In one embodiment, the method further includes tamper-proofing the card package such that the card multipack cannot be opened without visible damage.

According to another embodiment of the present invention, an automated apparatus for constructing card multipacks containing a plurality of cards includes a plurality of stations and a conveyer movable for conveying the card multipacks between the stations, wherein the plurality of stations includes: a carrier placing station at a first end of the apparatus and configured to place a carrier on the conveyor; a first shell placing station configured to place a first shell on the carrier such that a recessed portion of the first shell protrudes through an opening of the carrier; a plurality of card placing stations configured to sequentially place each of the plurality of cards in the recessed portion of the first shell; and a sealing station at a second end of the apparatus opposite the first end, the sealing station being configured to seal the multipack for containing the plurality of cards in the recessed portion of the first shell, wherein the first shell placing station is between the carrier placing station and the sealing station, and the card placing stations are between the first shell placing station and the sealing station.

In one embodiment, the plurality of stations further includes a second shell placing station between the plurality of card placing stations and the sealing station, the second shell placing station being configured to place a second shell on the carrier over the first shell and the plurality of cards.

The card placing stations may include vacuum devices for placing the cards. Similarly, the carrier placing station and the shell placing stations may include vacuum devices for placing the carriers and the shells. In one embodiment, the apparatus further includes a dispensing device configured to dispense an adhesive on at least one of the plurality of cards, such as on each of the plurality of cards.

In one embodiment, the apparatus further includes a plurality of cameras configured to create an image of respective ones of the plurality of cards and the carrier between the plurality of card placing stations and the sealing station. The apparatus may further include a software system adapted to compare and verify card bar codes and a carrier bar code with predetermined codes of a data file using the image, the card bar codes on corresponding ones of the plurality of cards being associated with the carrier bar code on the carrier.

Additional aspects and/or advantages of embodiments of the present invention are set forth in the following description and accompanying drawings, or may be obvious in view thereof to those skilled in the art.

BRIEF DESCRIPTION OF THE DRAWINGS

The above and other features and advantages will become more apparent to those of ordinary skill in the art by describing in detail some exemplary embodiments of the present invention with reference to the attached drawings, in which:

FIG. 24 is a flowchart showing tasks of a method of constructing a card multipack using the automated system for constructing card multipacks of FIG. 19.

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art.

Figure 1:
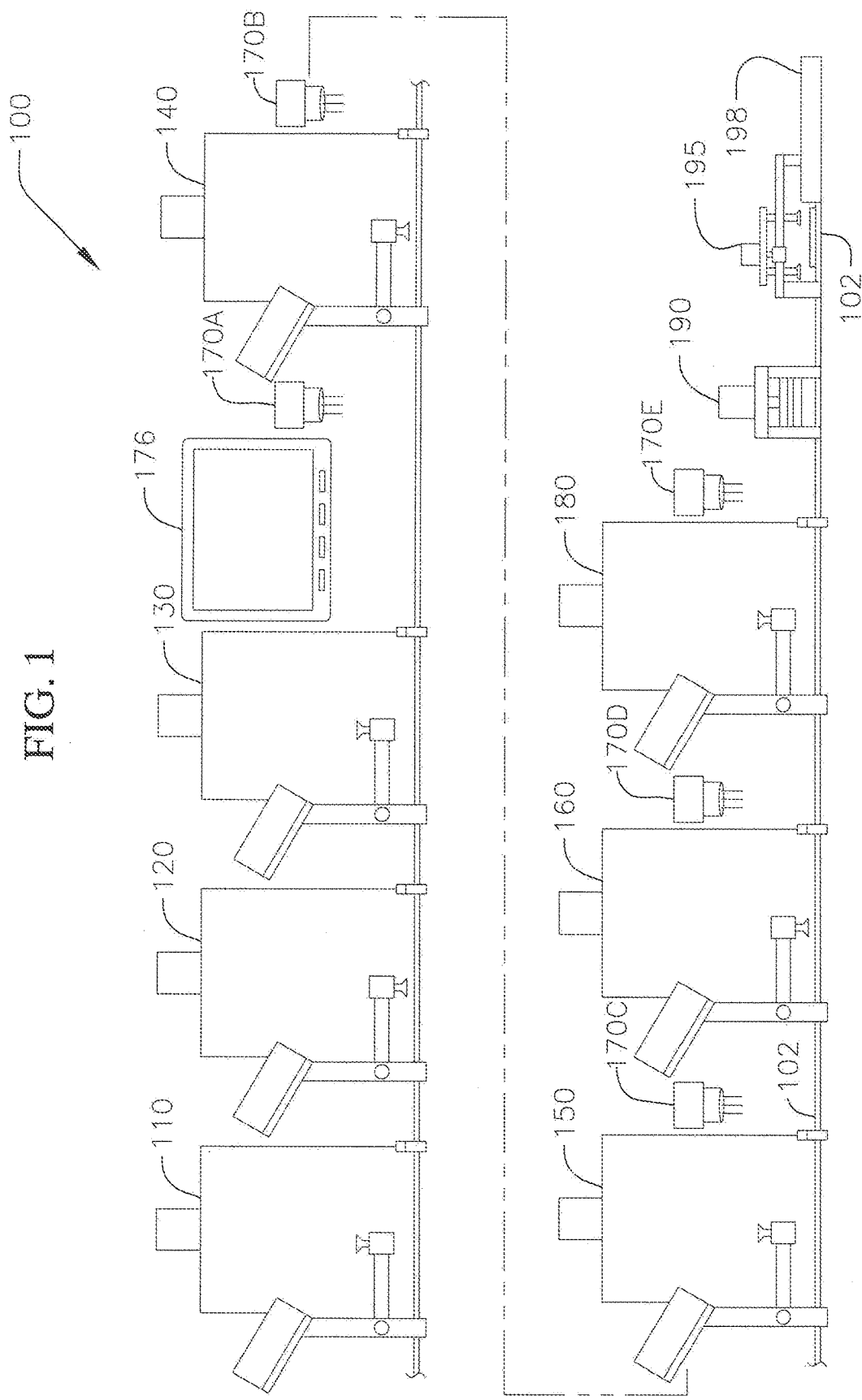
FIG. 1 is a schematic diagram of an automated system for constructing card multipacks according to an embodiment of the present invention.

With reference to FIG. 1, an automated system 100 for constructing card multipacks according to one embodiment of the present invention includes a movable conveyor 102, a first carrier placing station 110, a second carrier placing station 120, a first card placing station 130, a second card placing station 140, a third card placing station 150, a fourth card placing station 160, a data capture station 170A, a third carrier placing station 180, and a sealing station 190. In one embodiment, the data capture station 170A is a first data capture station, and the system 100 further includes a second data capture station 170B, a third data capture station 170C, a fourth data capture station 170D, and a fifth data capture station 170E. The system 100, according to an embodiment, further includes a computer 176 and an associated software system, as described later herein. In one embodiment, the system further includes a transporting station 195 configured to move the sealed card multipacks to a receiving bin 198. The conveyor 102, in one embodiment, is movable between each of the stations and devices shown and described above.

While the system 100 shown in FIG. 1 including each of the stations and devices described above is one embodiment of the present invention, the present invention is not limited thereto. For example, in other embodiments, one or more of the stations or devices of the system 100 shown in FIG. 1 may be absent and/or additional stations or devices may be added. For example, in one alternative embodiment, the system may have any other desired number of card placing stations rather than four. In another embodiment, for example, where a constructed card multipack has only two carrier portions (e.g., a blisterless paper-to-paper package), the second carrier placing station 120 may be omitted. Further, while in one embodiment of the present invention, the stations and devices of the system 100 shown in FIG. 1 are arranged in the sequence shown relative to one another, the present invention is not limited thereto. That is, the stations and devices of the system 100 may be arranged in any other suitable sequence relative to one another. Further, in one embodiment, as shown in FIG. 1, the stations and devices of the system 100 are arranged in an assembly line form, and the conveyor 102 is configured to move the card multipacks 10 from one station or device to the next.

Figure 2:
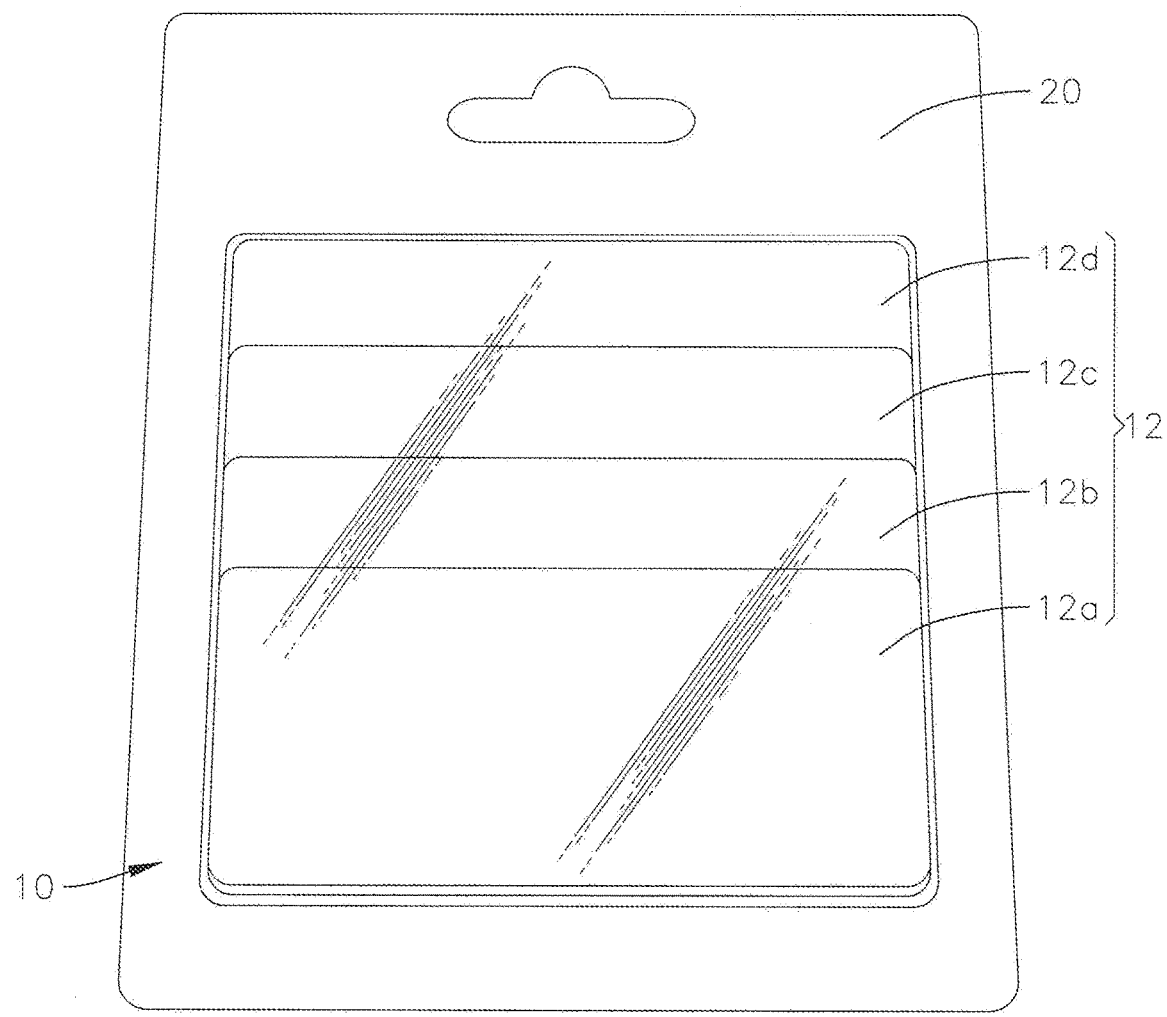
FIG. 2 is a front view of a card multipack constructed using the automated system for constructing card multipacks of FIG. 1, according to an embodiment of the present invention.
Figure 3A:
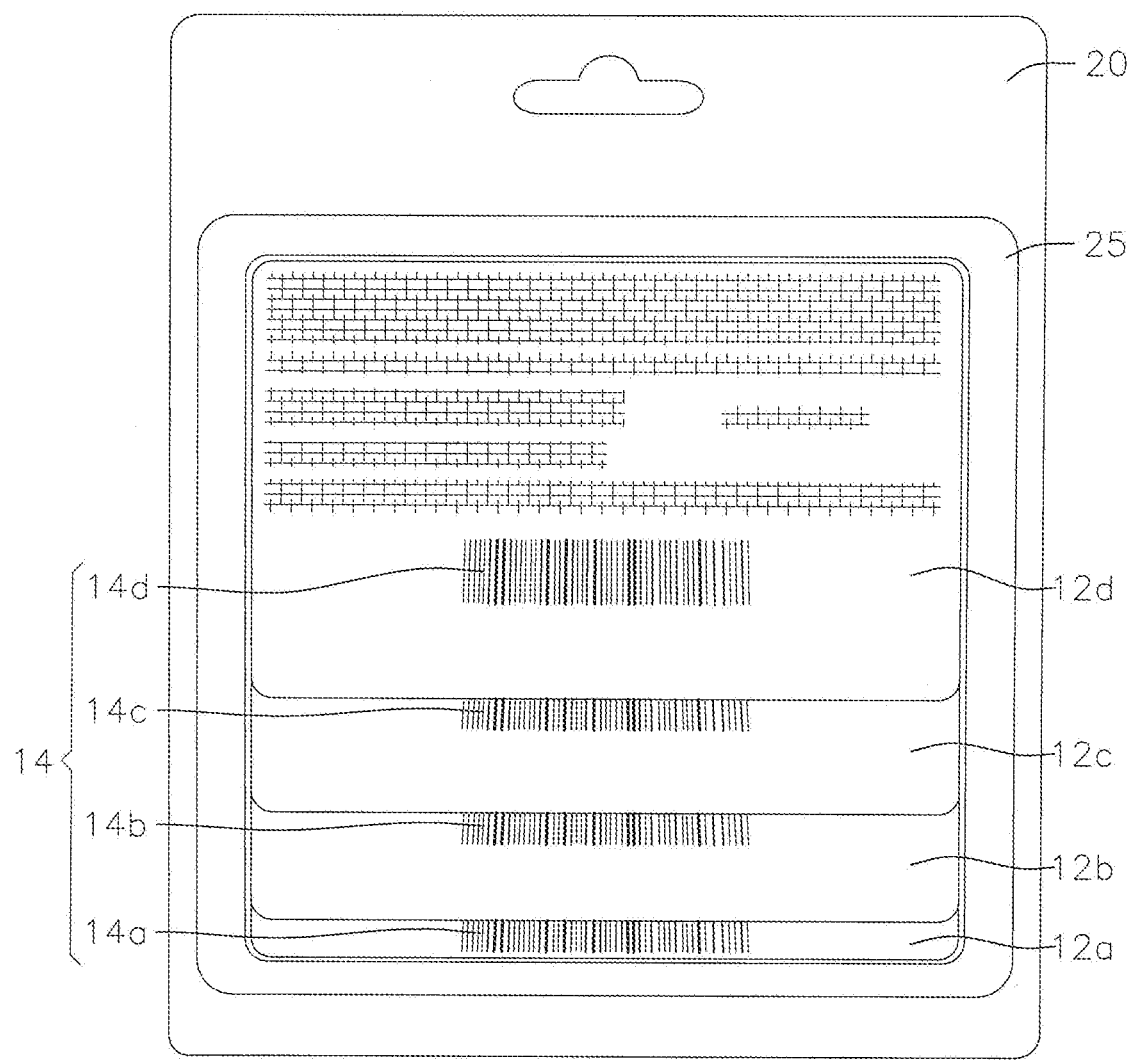
FIG. 3A is a rear view of the card multipack of FIG. 2, shown in an unsealed state.
Figure 3B:
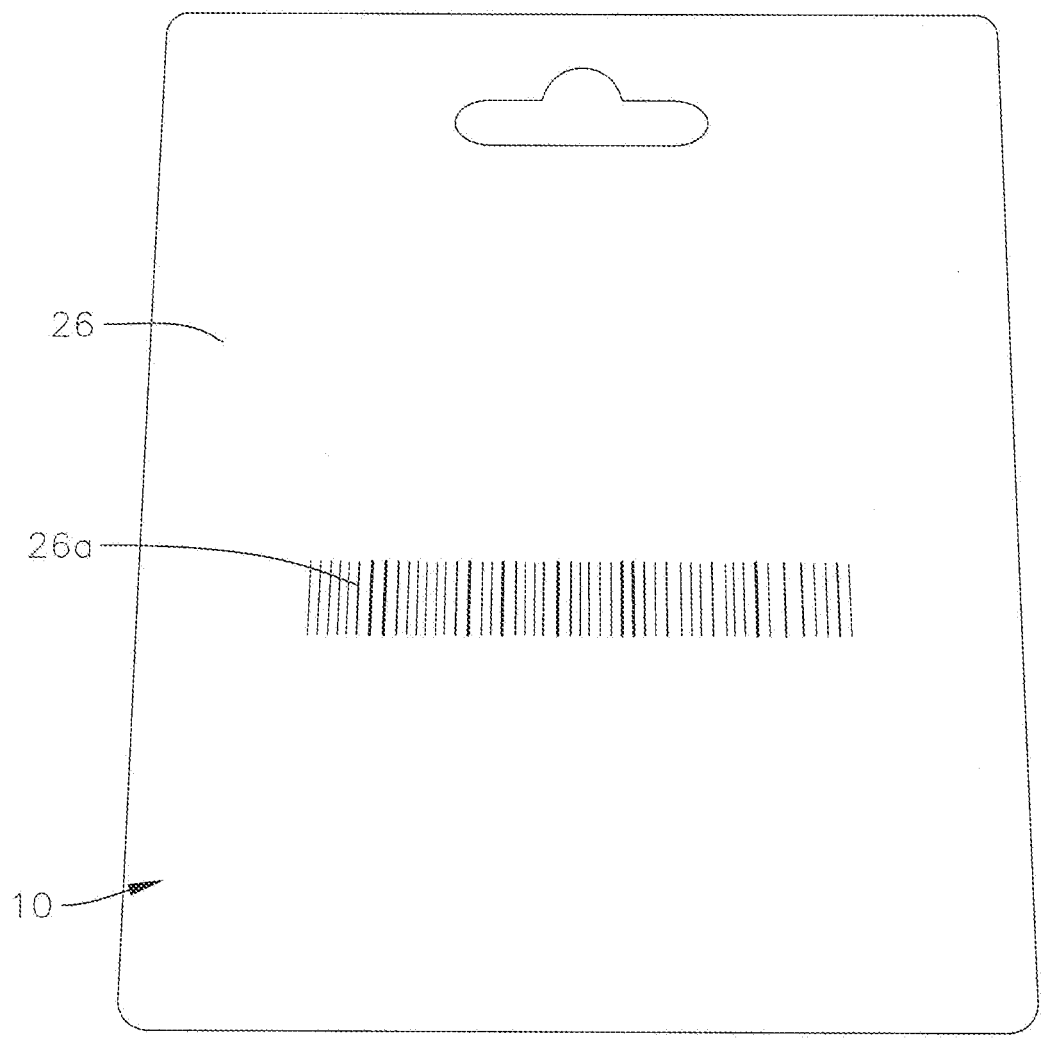
FIG. 3B is a rear view of the card multipack of FIG. 2, shown in a sealed state.
Figure 4A:
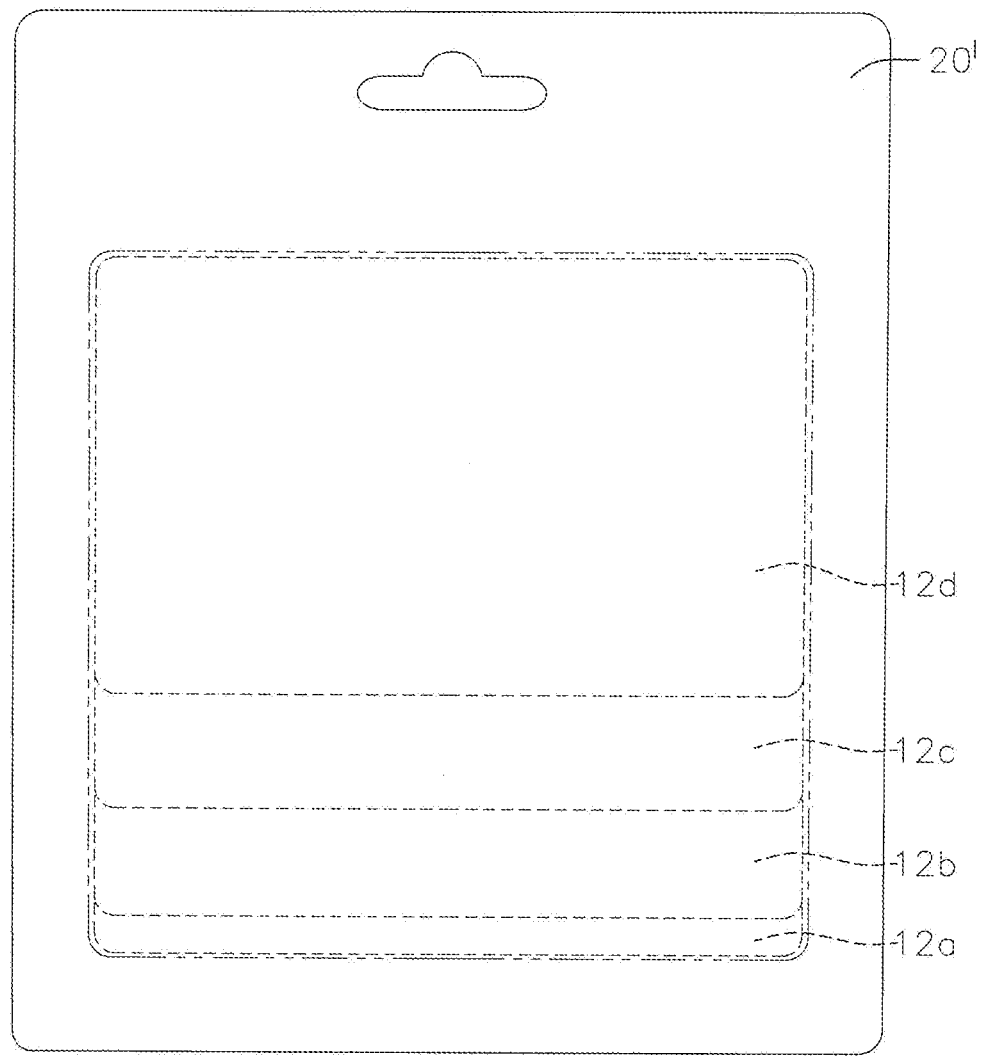
FIG. 4A is a front view of a card multipack according to another embodiment.
Figure 4B:
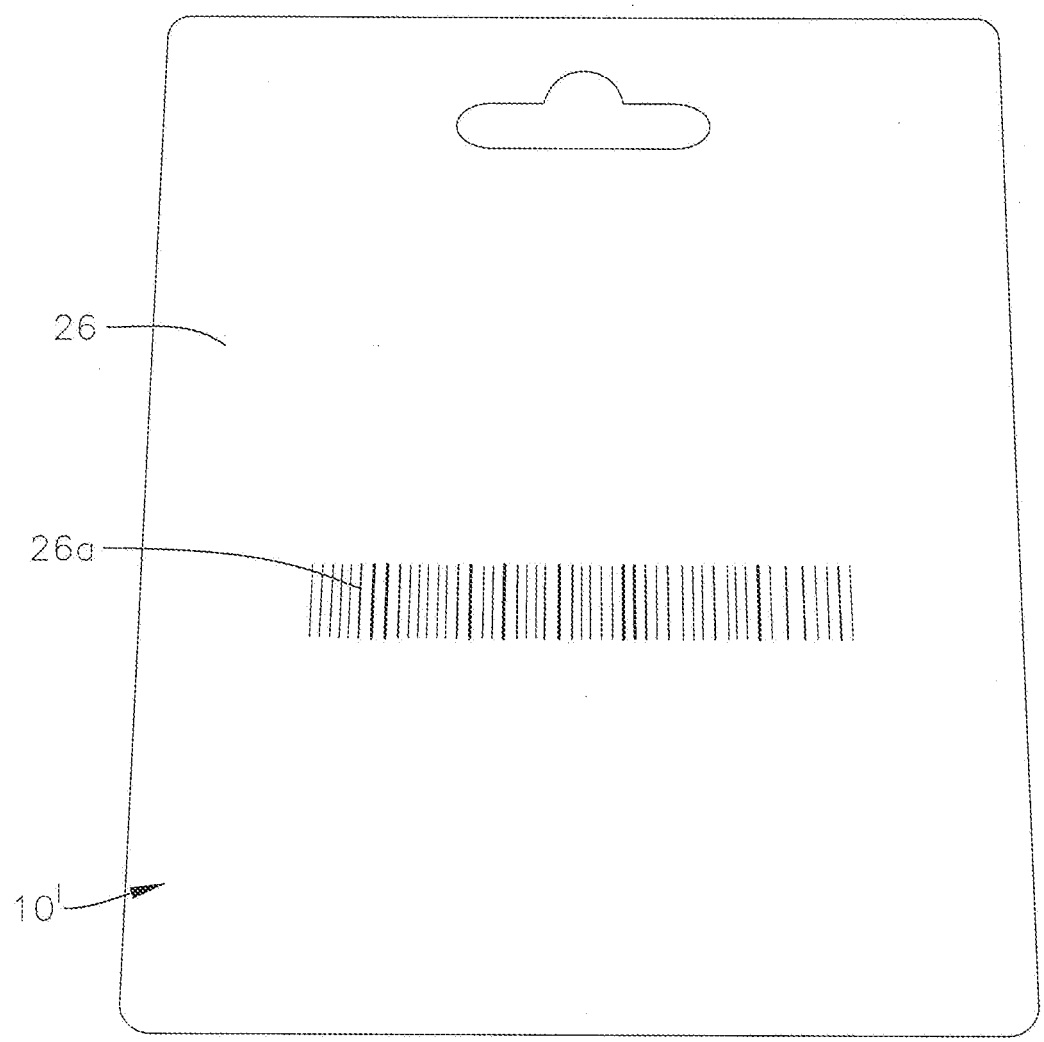
FIG. 4B is a rear view of the card multipack of FIG. 4A, shown in a sealed state.

With reference to FIGS. 2-3B, a card multipack 10 according to one embodiment of the present invention is shown. The card multipack 10, for example, may be constructed using the automated system 100. In FIG. 2, the card multipack 10 is shown in a sealed state containing, for example, four stored value cards 12, that is, a first stored value card 12a, a second stored value card 12b, a third stored value card 12c, and a fourth stored value card 12d. As used herein, the term "stored value card" refers to any card having a value stored on or associated with the card, including, but not limited to, gift certificates or gift cards, prepaid credit cards, and prepaid phone cards. FIG. 3A shows the card multipack 10 in an unfolded state and shows each of the stored value cards 12 having a card bar code 14, that is, a first card bar code 14a on the first stored value card 12a, a second card bar code 14b on the second stored value card 12b, a third card bar code 14c on the third stored value card 12c, and a fourth card bar code 14d on the fourth stored value card 12d. Further, in one embodiment, the stored value cards 12 may have magnetic stripes which may be used for activation and/or redemption, for example. In one embodiment, as also shown in FIG. 3A, the card multipack 10 includes a carrier base 20 and a first carrier shell 25, or blister, holding the stored value cards 12. The card multipack 10, in one embodiment, has a second carrier portion 26 having a carrier bar code 26a on an outer surface, as shown in FIG. 3B. The card multipack 10 is shown in a sealed state in FIG. 3B. However, embodiments of a card multipack according to the present invention are not limited to the configuration shown in FIGS. 2-3B. In another embodiment, for example, with reference to FIGS. 4A and 4B, in a card multipack 10', the first carrier shell 25, or blister, is omitted, and a carrier base 20' may not have an opening (see FIG. 12) for receiving the first carrier shell 25 such that the stored value cards 12 may be supported directly on the carrier base 20'. In one embodiment, each of the card bar codes 14 is linked to the carrier bar code 26a to be activated therewith. Alternatively, the second carrier portion may have a window (not shown) through which the card bar code 14 of one of the stored value cards 12, i.e. a parent card is readable, or scannable, after the card multipack 10 has been sealed to activate other ones of the stored value cards 12, i.e. child cards. Also, according to embodiments of the present invention, the number of stored value cards in each card multipack is not limited to any particular number, and the number of cards in each card multipack may be four, five, or ten, for example.

As shown in FIG. 3A, the stored value cards 12 may be placed, or stacked, on one another in the card multipack 10 in an overlapping manner such as to at least partially cover the respective card bar code 14 of the one or more overlapped stored value cards 12. As such, the card multipack 10 may have a compact size. In an embodiment, the respective card bar code 14 of each of the one or more overlapped stored value cards 12 is read by one of the data capture stations prior to a subsequent one of the stored value cards 12 being placed.

Figure 5:
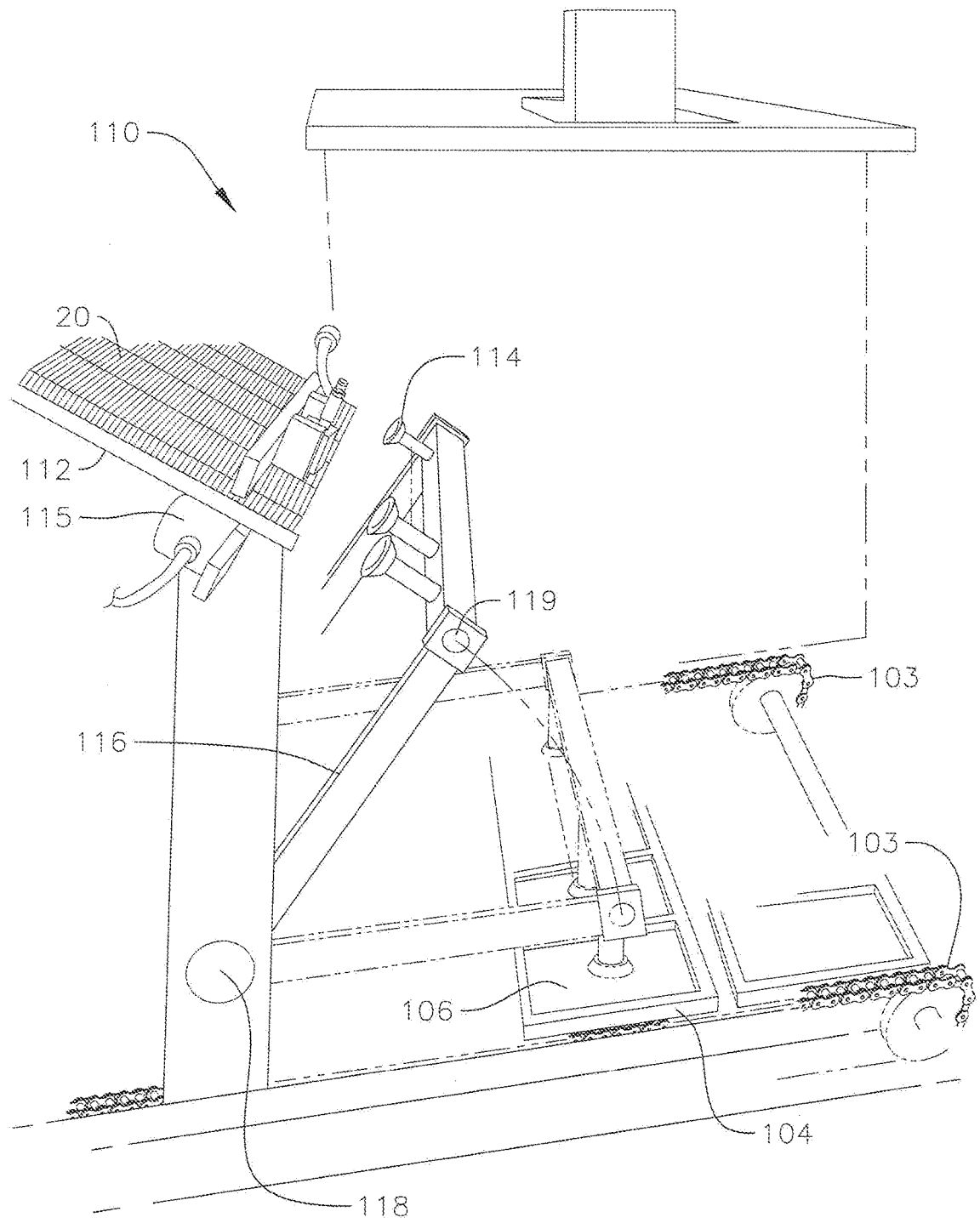
FIG. 5 is a front schematic view of a carrier placing station of the automated system for constructing card multipacks of FIG. 1, according to an embodiment of the present invention.

With reference to FIG. 5, in one embodiment, the conveyor 102 is made up of a pair of chains 103 driven by a motor, for example, and a plurality of tooling plates 104 coupled between the pair of chains 103 but, alternatively, may include a belt or any other movable conveying device known in the art. Further, the conveyor 102 may be configured to provide a stepwise or intermittent movement of the tooling plates 104 to each of the stations. In an embodiment, each of the tooling plates 104 may have alignment portions 105 (e.g., pins or protrusions) (see FIG. 9) to align the carrier base 20, such as around a perimeter thereof, and may further include one or more recesses 106 to receive the first carrier shell 25. In an embodiment, the tooling plate 104 includes a height adjusting portion 108 (see FIG. 9) on an upper surface of the tooling plate 104 to adjust for a thickness of the card multipack 10 or one or more components thereof, thereby facilitating sealing of the card multipack 10. In an embodiment, the height adjusting portion 108 may be a removable or interchangeable insert or gasket. In one embodiment, the height adjusting portion 108 is a fiberglass-reinforced or fabric-reinforced silicone sheet having a thickness of 3/32", which may be adhered to the upper surface of the tooling plate 104. However, embodiments of the present invention are not limited thereto. In one embodiment, the system 100 is configured to perform an operation concurrently on a plurality of the card multipacks 10 at each of the stations. As such, each of the tooling plates 104 may include a plurality (e.g., four, five, or ten, for example) of the recesses 106, as shown.

With further reference to FIG. 5, the first carrier placing station 110 is configured to place the carrier base 20 on the conveyor 102. For example, the timing of the conveyor 102 and the first carrier placing station 110 may be set relative to one another by any suitable device or method known in the art. In one embodiment, the first carrier placing station 110 includes a holding rack 112 for holding a stack of the carrier bases 20 to be placed on the conveyor 102. Further, in one embodiment, the first carrier placing station 110 includes one or more placing mechanisms 114 configured to grab one of the carrier bases 20 from the holding rack 112 and place the carrier base 20 on the tooling plate 104 of the conveyor 102. In one embodiment, the placing mechanisms 114 are connected to vacuum or suction lines, wherein suction is applied from a suction-generating device 115 (e.g., a vacuum pump), for grabbing and holding the carrier base 20 and is released for placing the carrier base 20 on the conveyor 102. Further, in one embodiment, the placing mechanisms 114 are coupled to an arm 116 that is pivotable about a shaft 118, and the arm 116 is pivotable back and forth at a desired rate for grabbing and placing the carrier bases 20 on the conveyor 102. Further, the placing mechanisms 114 may be rotatably coupled to the arm 116 about a pivot 119. However, embodiments of the first carrier placing station 110 of the present invention are not limited to the above-described and shown configuration, but rather, may have any other suitable configuration for placing the carrier base 20 on the conveyor 102.

Figure 6:
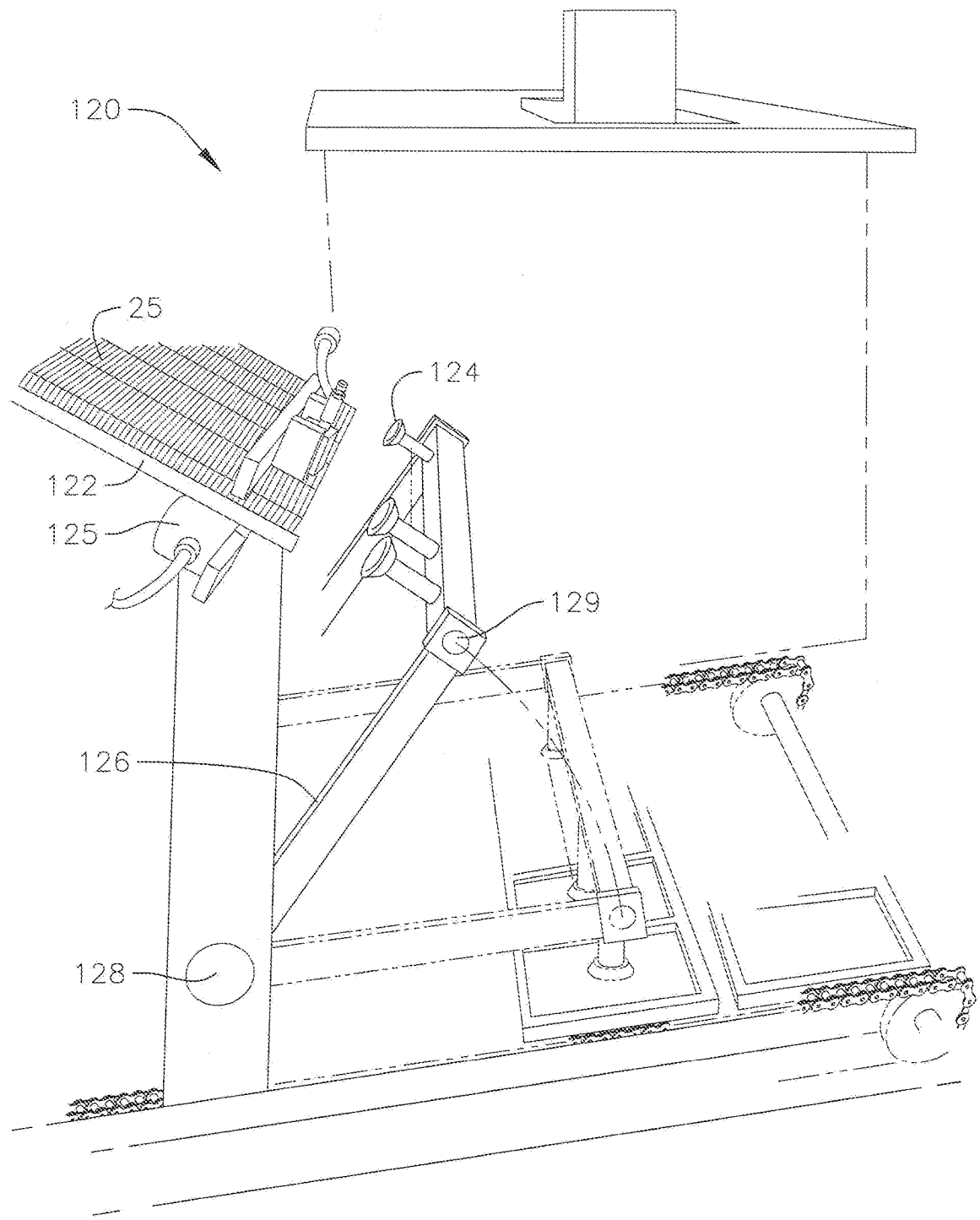
FIG. 6 is a front schematic view of a shell placing station of the automated system for constructing card multipacks of FIG. 1, according to an embodiment of the present invention.

With reference to FIG. 6, the second carrier placing station 120 is configured to place the first carrier shell 25 on the carrier base 20. In one embodiment, the second carrier placing station 120 includes a holding rack 122 for holding a stack of the first carrier shells 25 to be placed on the carrier bases 20. Further, in one embodiment, the second carrier placing station 120 includes one or more placing mechanisms 124 configured to grab one of the first carrier shells 25 from the holding rack 122 and place the first carrier shell 25 on the carrier base 20. In one embodiment, the first carrier shell 25 is placed on the carrier base 20 such that a recessed portion of the first carrier shell 25 protrudes through an opening 24 (see FIG. 12) formed in the carrier base 20. In one embodiment, the placing mechanisms 124 are connected to vacuum or suction lines, wherein suction is applied from a suction-generating device 125 (e.g., a vacuum pump) for grabbing and holding the first carrier shell 25 and is released for placing the first carrier shell 25 on the carrier base 20. Further, in one embodiment, the placing mechanisms 124 are coupled to an arm 126 that is pivotable about a shaft 128, and the arm 126 is pivotable back and forth at a desired rate for grabbing and placing the first carrier shells 25 on the carrier bases 20. Further, the placing mechanisms 124 may be rotatably coupled to the arm 126 about a pivot 129. Embodiments of the second carrier placing station 120 of the present invention are not limited to the above-described embodiment, but rather, may have any other suitable configuration for placing the first carrier shells 25 on the carrier bases 20.

Figure 7:
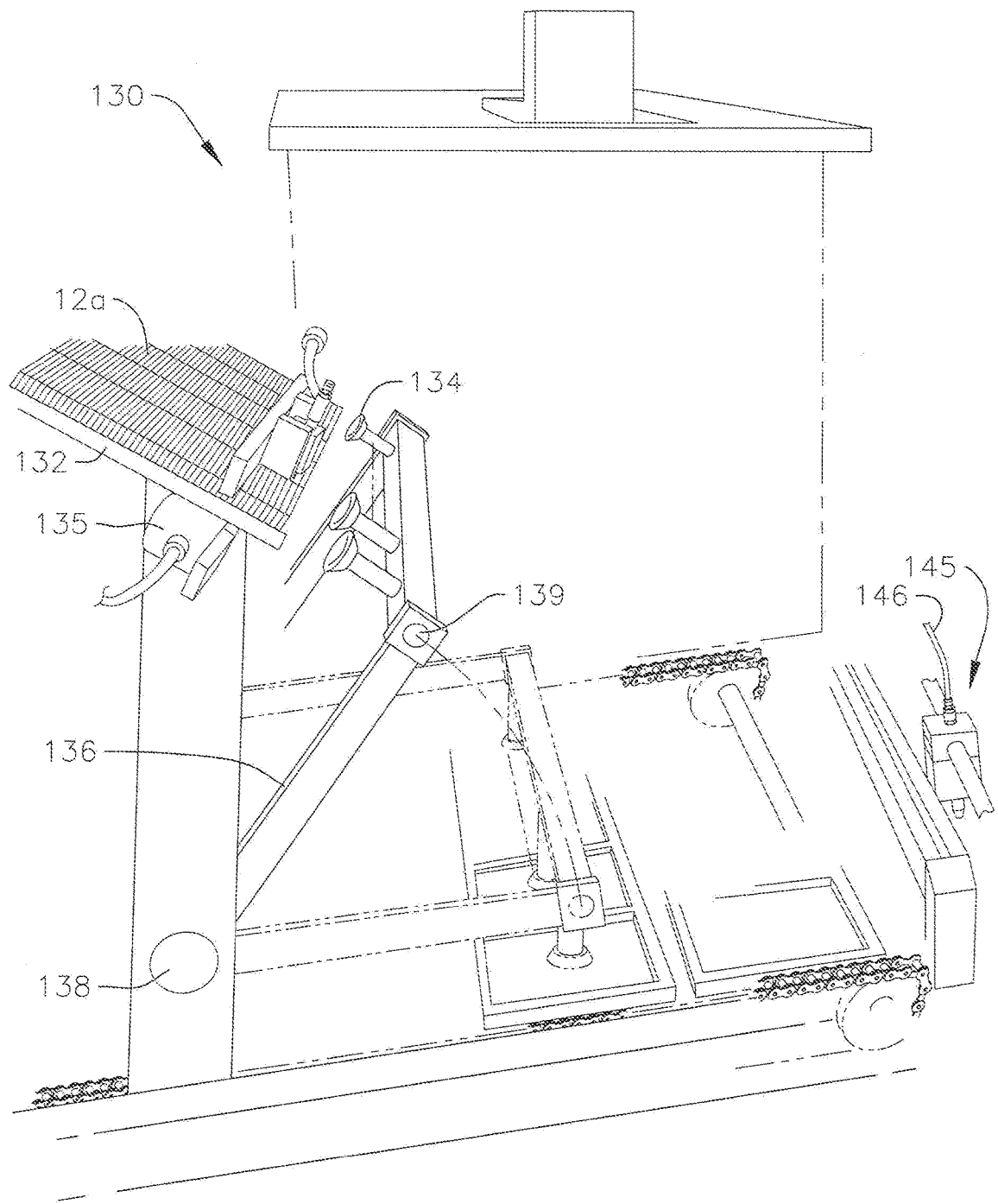
FIG. 7 is a front schematic view of a card placing station of the automated system for constructing card multipacks of FIG. 1, according to an embodiment of the present invention.

With reference to FIG. 7, the first card placing station 130 is configured to place the first stored value card 12a in the first carrier shell 25. In one embodiment, the first card placing station 130 is configured similarly or the same as the second carrier placing station 120 described above. The first card placing station 130, in one embodiment, includes a holding rack 132 for holding a stack of the first stored value cards 12a to be placed in the first carrier shells 25. Further, in one embodiment, the first card placing station 130 includes one or more placing mechanisms 134 configured to grab one of the first stored value cards 12a from the holding rack 132 and place the first stored value card 12a in the first carrier shell 25. In one embodiment, the placing mechanisms 134 are connected to vacuum or suction lines, wherein suction is applied from a suction-generating device 135 (e.g., a vacuum pump) for grabbing and holding the first stored value card 12a and is released for placing the first stored value card 12a in the first carrier shell 25. Further, in one embodiment, the placing mechanisms 134 are coupled to an arm 136 that is pivotable about a shaft 138, and the arm 136 is pivotable back and forth at a desired rate for grabbing and placing the first stored value cards 12a in the first carrier shells 25. Further, the placing mechanisms 134 may be rotatably coupled to the arm 136 about a pivot 139. Embodiments of the first card placing station 130 of the present invention are not limited to the above-described embodiment, but rather, may have any other suitable configuration for placing the first stored value cards 12a in the first carrier shells 25.

In one embodiment, the second card placing station 140, the third card placing station 150, and the fourth card placing station 160 are each configured similar to or the same as the first card placing station 130 described above and shown in FIG. 7, and therefore will not be described in further detail. Each of the second card placing station 140, the third card placing station 150, and the fourth card placing station 160 are configured to place one of the stored value cards 12 on a previously placed one of the stored value cards 12 in the first carrier shell 25. As described above, in other embodiments of the system 100, there may be additional card placing stations or fewer than the four card placing stations shown in FIG. 1. In one embodiment, there may be only one card placing station. Further, in one embodiment, one or more of the card placing stations may be configured to place more than one of the stored value cards 12 in the first carrier shell 25. Further, the card placing stations 130, 140, 150, 160, in one embodiment, are configured similarly to the carrier placing stations 110, 120, 180, and, in one embodiment, one or more of the carrier placing stations 110, 120, 180 may be utilized as a card placing station or vice versa.

With further reference to FIG. 7, the system 100, in one embodiment, includes one or more adhesive dispensing devices 145. The adhesive dispensing devices 145, in one embodiment, are configured to dispense an adhesive on one or more of the stored value cards 12 in order to maintain the stored value cards 12 in place once the stored value cards 12 are placed in the first carrier shell 25. In one embodiment, the adhesive dispensing device 145 includes an adhesive supply tube 146 through which the adhesive is supplied via a pump or other suitable device. Further, the adhesive may be dispensed through a nozzle or other suitable device. The one or more adhesive dispensing devices 145, in one embodiment, may be located before or after one or more of the card placing stations 130, 140, 150, 160. Also, in an embodiment, one or more adhesive dispensing devices may be located and configured to dispense an adhesive on one or more of the carrier portions.

Figure 8:
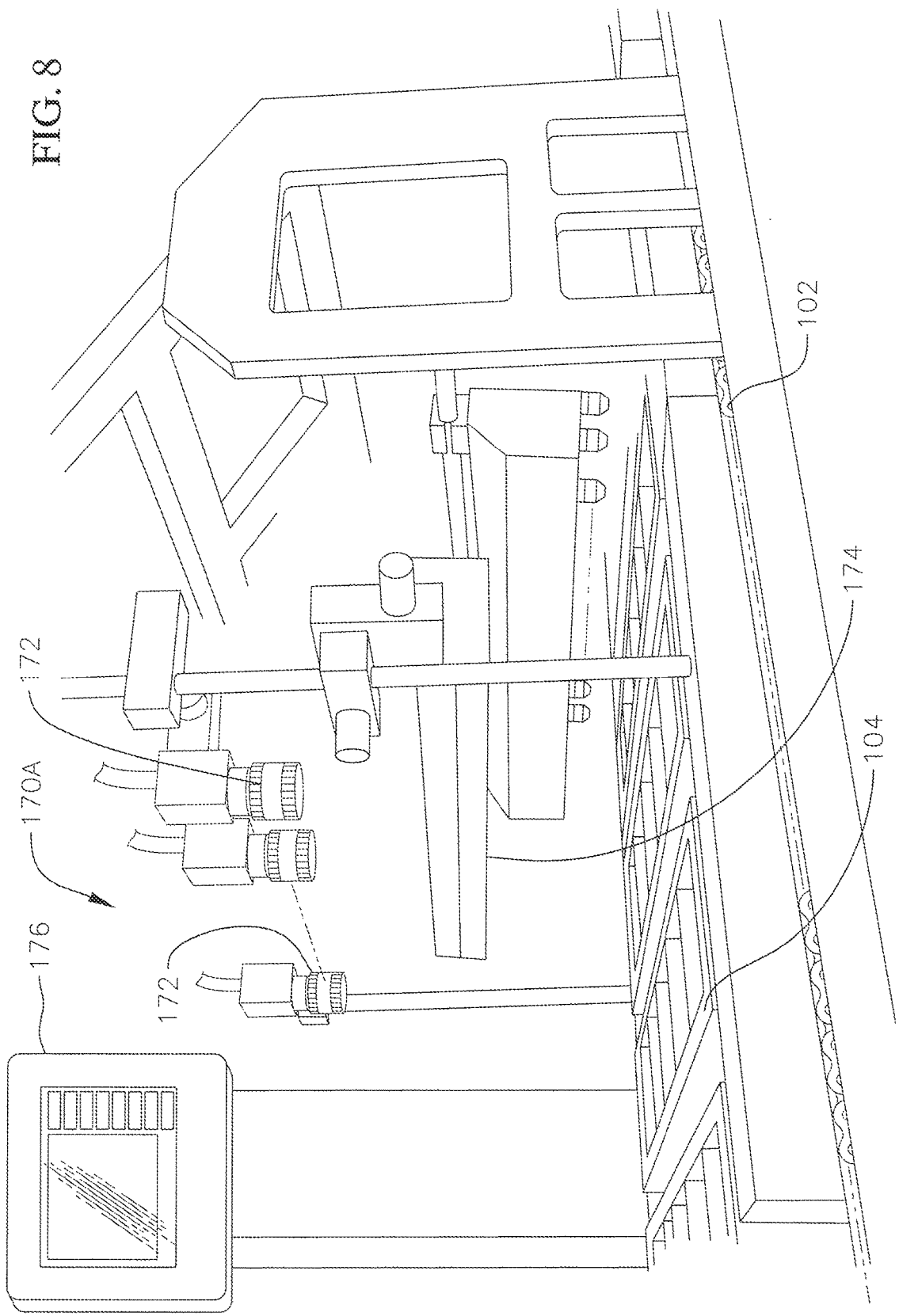
FIG. 8 is a front schematic, view of a data capture station of the automated system for constructing card multipacks of FIG. 1, according to an embodiment of the present invention.

With reference to FIG. 8, the first data capture station 170A, in one embodiment, is configured to read the first card bar code 14a from each of the first stored value cards 12a placed in the first carrier shell 25. The first data capture station 170A, in one embodiment, includes one or more cameras 172 configured to create an image of the first card bar codes 14a. In an embodiment, the camera is Model No. 21445476 manufactured by Basler, Ahrensburg, Germany. In one embodiment, the first data capture station 170A further includes at least one illuminating device 174, such as an LED flash, configured to provide illumination on the first card bar codes 14a when the one or more cameras 172 capture the image. In one embodiment, the first data capture station 170A is configured to read the first card bar code 14a at a location between the first card placing station 130 and the second card placing station 140 before the second stored value card 12b is placed on the first stored value card 12a. In one embodiment, as shown, the first data capture station 170A includes a plurality (e.g., four, five, or ten, for example) of the cameras 172 configured to concurrently create images of the respective first card bar codes 14a on each of the tooling plates 104.

In one embodiment, each of the second to fifth data capture stations 170B, 170C, 170D, 170E may be configured the same or similarly to the first data capture station 170 and, therefore, will not be described further. In one embodiment, the second data capture station 170B is configured to read the second card bar code 14b at a location between the second card placing station 140 and the third card placing station 150 before the third stored value card 12c is placed on the second stored value card 12b, the third data capture station 170C is configured to read the third card bar code 14c at a location between the third card placing station 150 and the fourth card placing station 160 before the fourth stored value card 12d is placed on the third stored value card 12c, the fourth data capture station 170D is configured to read the fourth card bar code 14d at a location between the fourth card placing station 160 and the third carrier placing station 180 before the second carrier portion 26 is placed over the fourth stored value card 12d, and the fifth data capture station 170E is configured to read the carrier bar code 26a at a location after the second carrier portion 26 has been placed by the third carrier placing station 180.

With further reference to FIG. 8, the system 100 further includes a computer 176 including a software system adapted to compare and verify each of the card bar codes 14 with those of a data file associating, or linking, each of the card bar codes 14 with the carrier bar code 26a and/or with the other card bar codes 14 of the respective card multipack 10. In one embodiment, the data file associating, or linking, each of the card bar codes 14 is preexisting, and the system 100 compares and verifies the card bar codes 14 in-one after each of the respective stored value cards 12 is placed. In another embodiment, the software system creates the data file in-line and creates in the data file an association between each of the card bar codes 14 with the carrier bar code 26a and/or with the other card bar codes 14 of the respective card multipack 10. The software system, in one embodiment, verifies the card bar codes 14 with the data file using the image created by the respective cameras 172. In one embodiment, the data file is used for activating all of the stored value cards 12 in the card multipack 10 (e.g., at a time of purchase) using the carrier bar code 26a or, alternatively, the card bar code 14 of a parent card of the stored value cards 12 that is readable through a window of the carrier due to the association, or linking, in the data file.

The third carrier placing station 180 is configured to place the second carrier portion 26 over the stored value cards 12 and the first carrier shell 25 before the card multipack 10 is sealed. The third carrier placing station 180, in one embodiment, is configured similar to or the same as the second carrier placing station 120 described above and shown in FIG. 6, and therefore will not be described in further detail.

Figure 9:
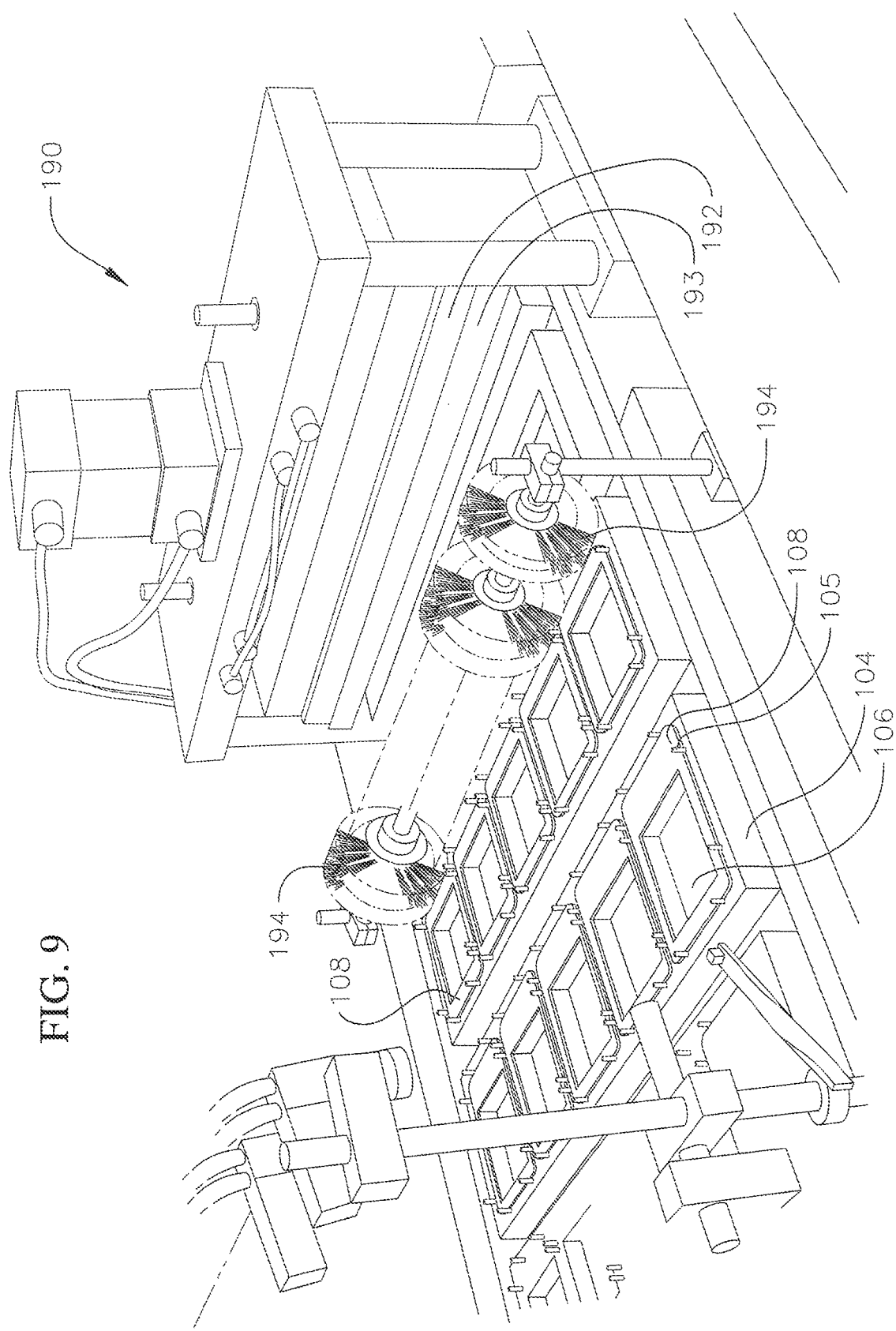
FIG. 9 is a front schematic view of a sealing station of the automated system for constructing card multipacks of FIG. 1, according to an embodiment of the present invention.

With reference to FIG. 9, the sealing station 190 is configured to seal the card multipack 10. In one embodiment, the sealing station 190 is configured to seal the second carrier portion 26, which may be made of paper or cardboard, to the first carrier shell 25, which may be made of plastic, and to the carrier base 20, which may also be made of paper or cardboard. In one embodiment, the sealing station 190 is configured, to seal the card multipack 10 using heat and an adhesive which may already be applied on at least one of the second carrier portion 26 or the carrier base 20. In one embodiment, the sealing station 190 includes a heat plate 192 configured to press on the second carrier portion 26. The sealing station 190 may further include a protective sheet 193, such as a polytetrafluoroethylene (PTFE) sheet, to prevent the second carrier portion 26 from adhering to the heat plate 192. The sealing station 190 may further include one or more devices, such as a hydraulic pump, configured to move the heat plate 192 downward. In one embodiment, the system 100 may include brushes 194, such as wire brushes located before the sealing station 190. The brushes 194 may rotate as the conveyor 102 moves the card multipacks 10 past the brushes 194 to press, or flatten, and align the second carrier portion 26 and the other components of the card multipack 10 before sealing. Also, brushes similar to the brushes 194 may be included between other stations of the system 10 for pressing and aligning any of various components of the card multipack 10 between stations.

Figure 10:
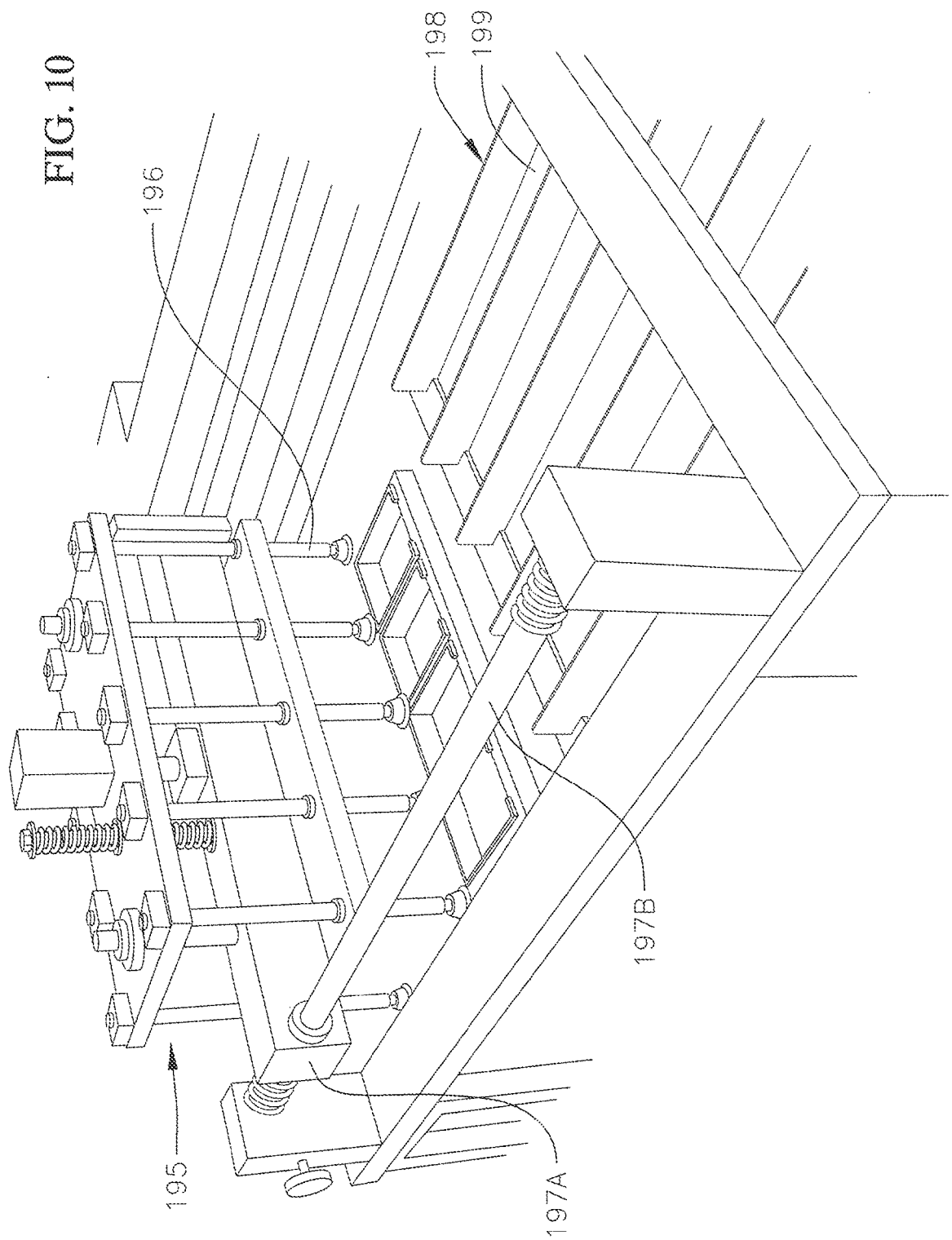
FIG. 10 is a front schematic view of a transporting station of the automated system for constructing card multipacks of FIG. 1, according to an embodiment of the present invention.

With reference to FIG. 10, the transporting station 195 is configured to transport the sealed card multipacks 10 from the conveyor 102 to the receiving bin 198. In one embodiment, the transporting station 195 includes one or more holding mechanisms 196, each configured to grab one of the sealed card multipacks 10 from the conveyor 102 and place the sealed card multipack 10 in a respective compartment 199 of the receiving bin 198. In one embodiment, the holding mechanisms 196 are connected to vacuum or suction lines, wherein suction is applied from a suction-generating device (e.g., a vacuum pump) for grabbing and holding the sealed card multipack 10 and is released for placing the sealed card multipack 10 in the receiving bin 198. Further, in one embodiment, the holding mechanisms 196 are coupled to an arm 197A that is movable along a rail 197B in both a direction toward the receiving bin 198 and back toward the sealing station 190. In an embodiment, the receiving bin 198 may be provided with a moving belt at a lower region of the compartments 199 to collect the sealed card multipacks 10 toward an end of the receiving bin 198 distal from the transporting station 195.

Figure 11:
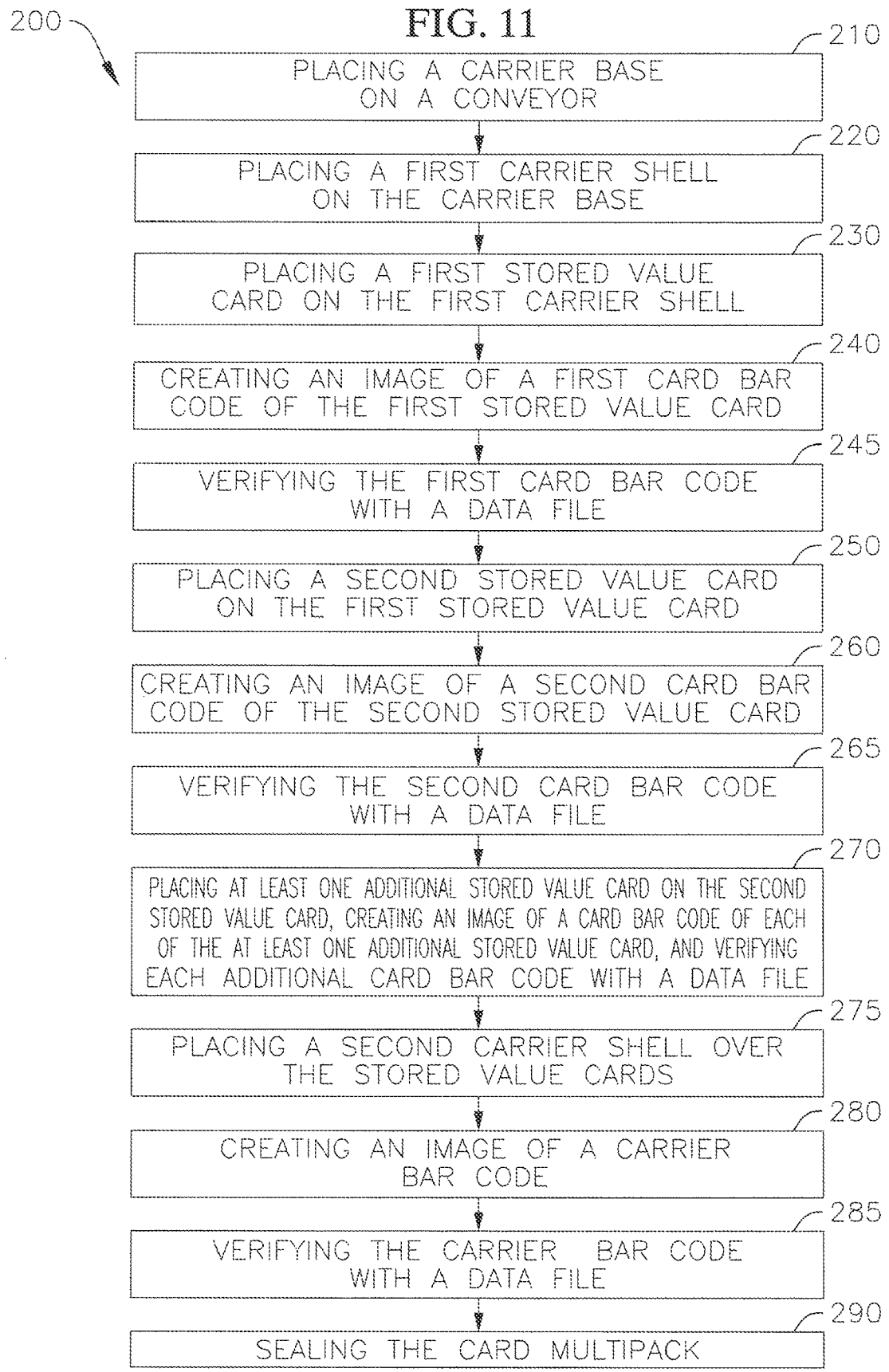
FIG. 11 is a flowchart showing tasks of a method of constructing a card multipack using the automated system for constructing card multipacks of FIG. 1.

With reference to FIG. 11, a method 200 of constructing a card multipack is shown. While the method 200 is described herein with respect to the card multipack 10 and the system 100 for constructing card multipacks described above and shown in FIG. 1, the method 200, or at least some of the tasks thereof, may be performed in constructing card multipacks according to other embodiments of the present invention and/or using an automated system or apparatus for constructing card multipacks according to other embodiments of the present invention, such as those described later herein.

Figure 12:
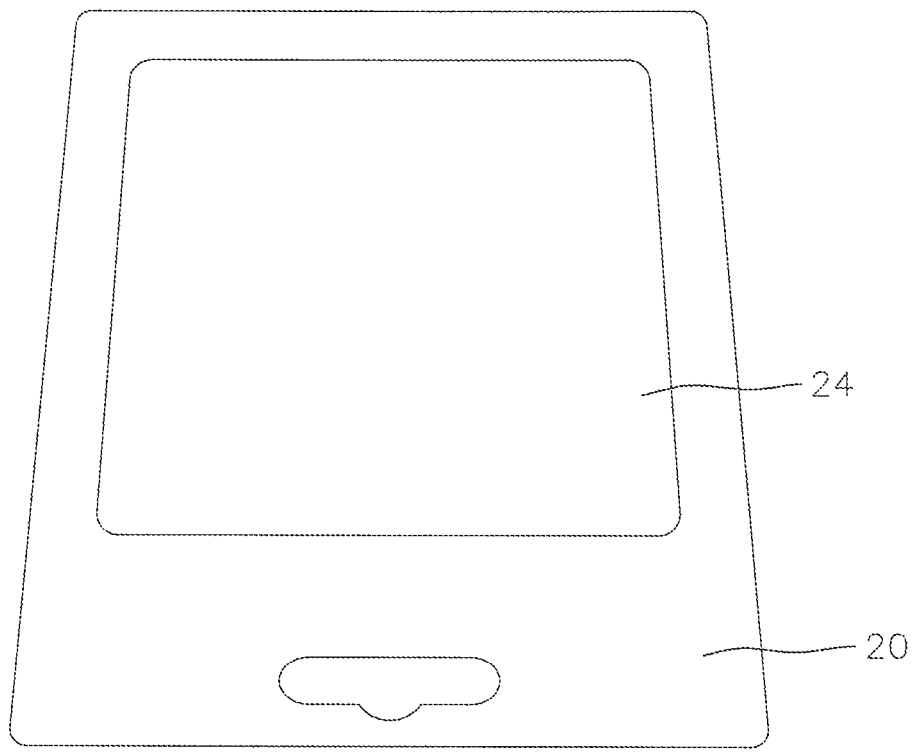
FIG. 12 is a rear perspective view of a carrier base of a card multipack to be placed on a conveyer of the automated system for constructing card multipacks of FIG. 1.

With reference to FIG. 12, in one embodiment, the method 200 includes a task 210 of placing a carrier base 20 of the card multipack 10 on the conveyor 102, such as by using the first carrier placing station 110 of the system 100 described above and shown in FIG. 5. In one embodiment, the carrier base 20 may be made of paper of cardboard.

Figure 13:
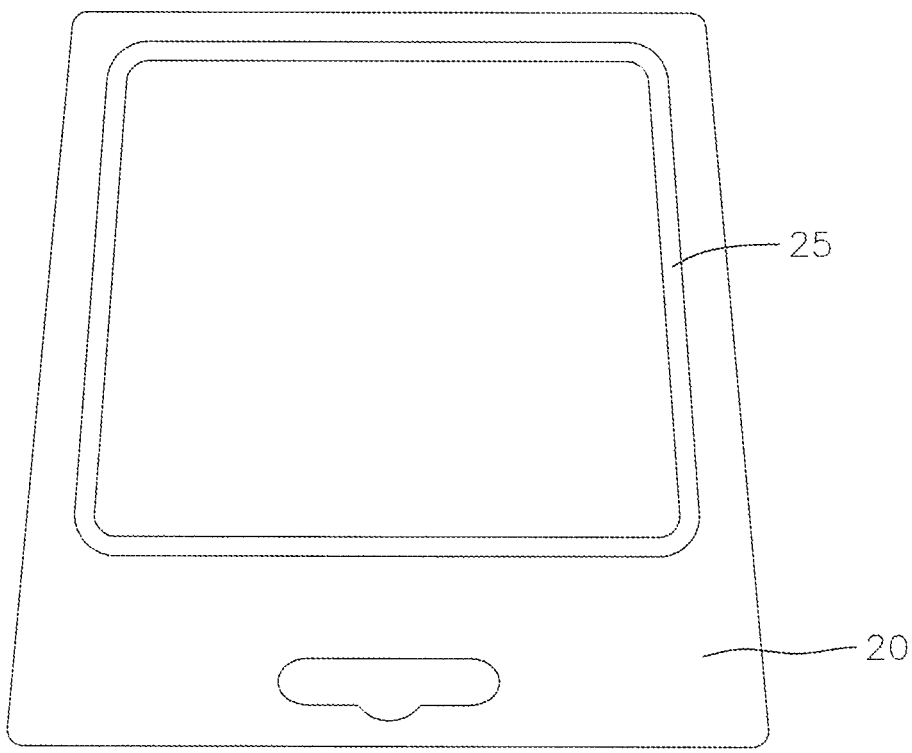
FIG. 13 is a rear perspective view of a first carrier shell of a card multipack placed on the carrier base of FIG. 12.
Figure 14:
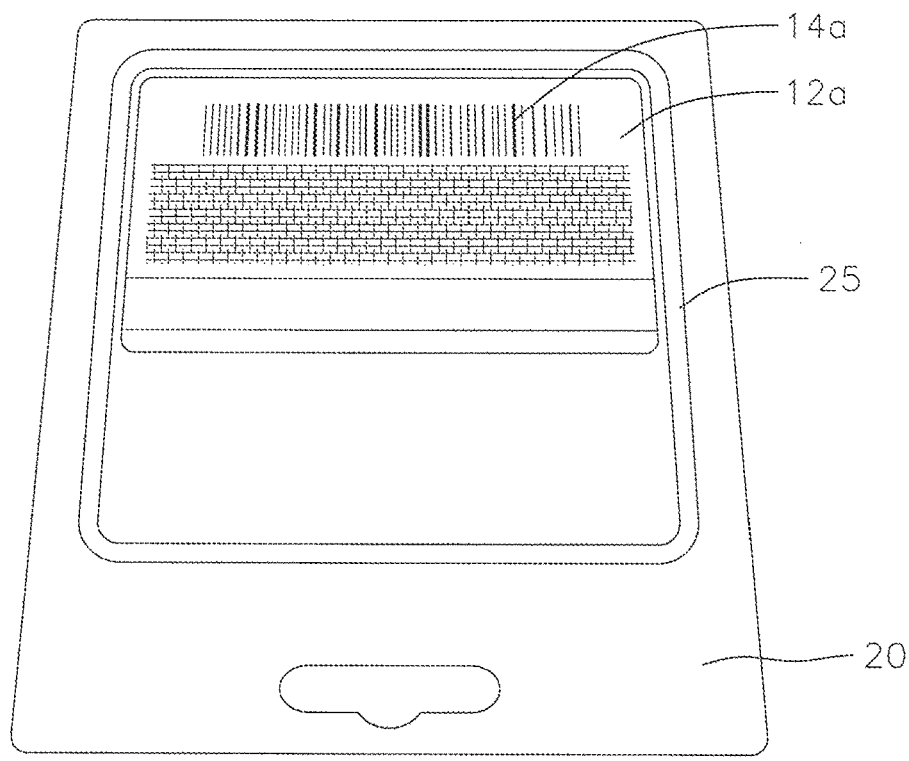
FIGS. 14-17 are rear perspective views of stored value cards placed on the first carrier shell of FIG. 13.
Figure 15:
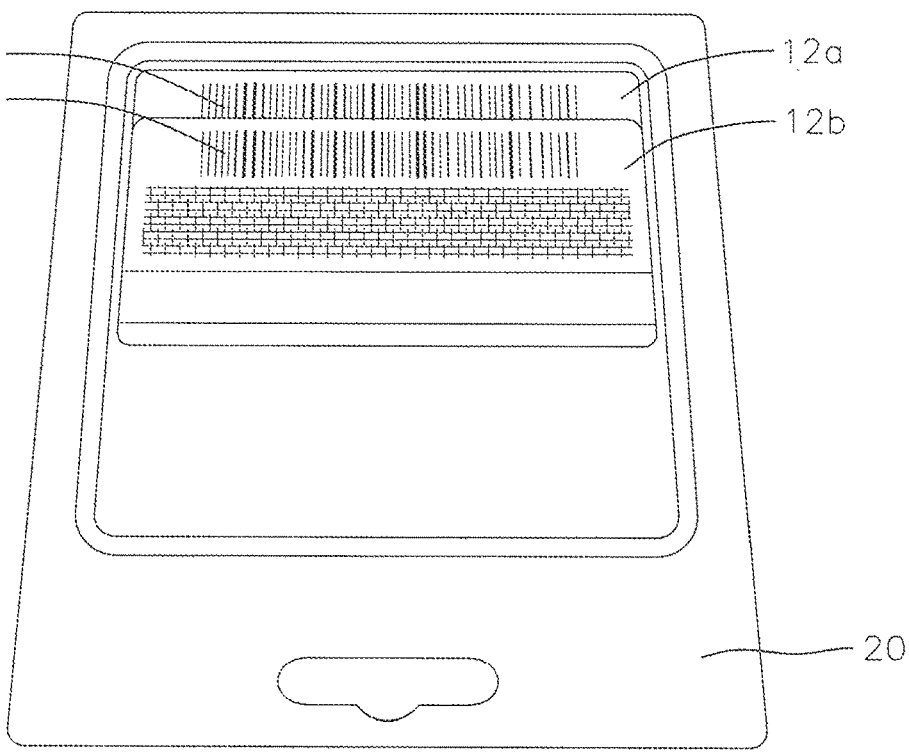
Figure 16:
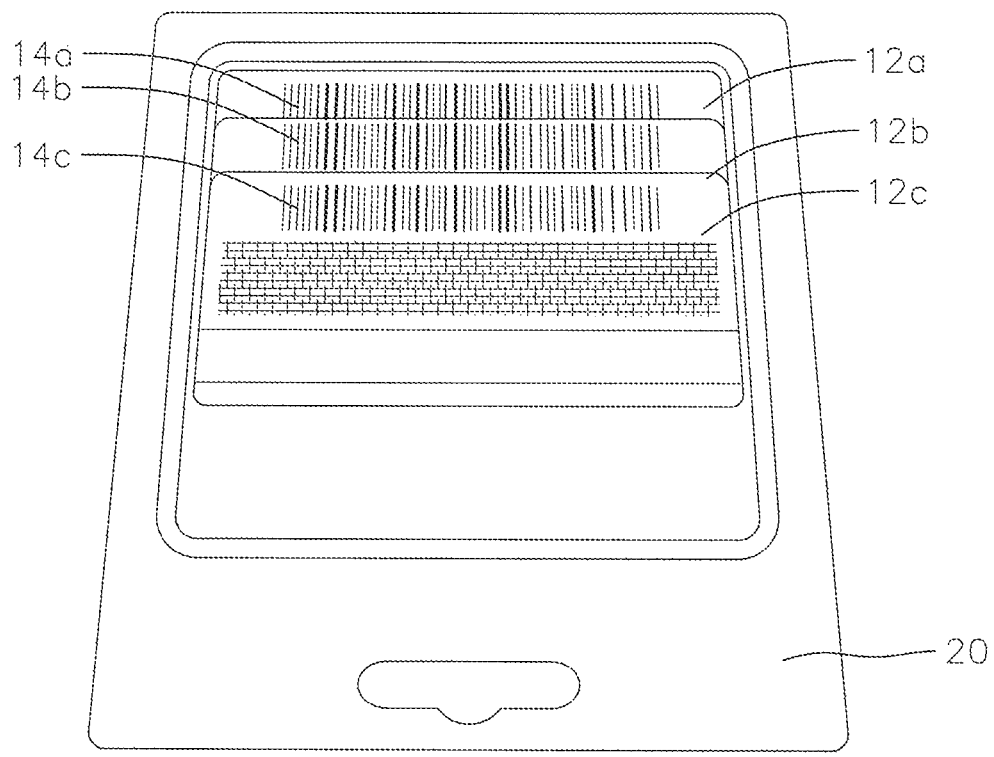
Figure 17:
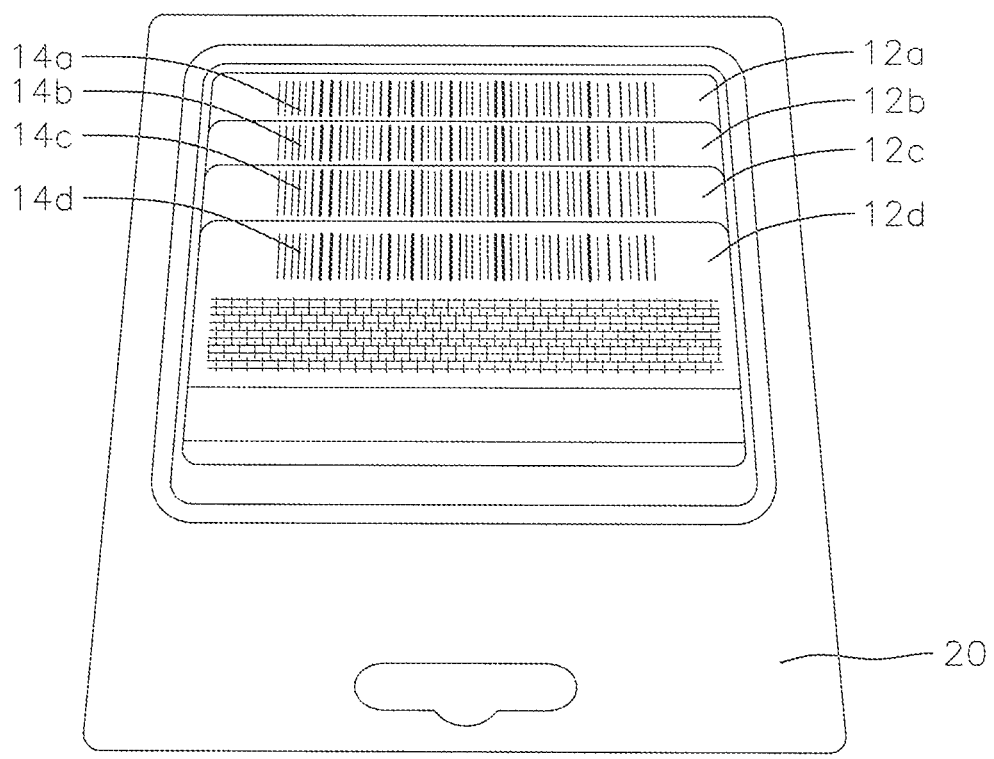

With reference to FIG. 13, the method 200, in one embodiment, further includes a task 220 of placing the first carrier shell 25 on the carrier base 20, such as by using the second carrier placing station 120 of the system 100 described above and shown in FIG. 6. In one embodiment, for example, the carrier base 20 has the opening 24 (see FIG. 12) formed therethrough, and the first carrier shell 25 has a recessed, or cupped portion, and is placed on the carrier base 20 such that the recessed portion protrudes through the opening 24. In an alternate embodiment, the card multipack 10 does not include the first carrier shell 25, or blister, and the task 220 may be omitted.

With reference to FIGS. 14-17, the method 200, in one embodiment, further includes a task of placing the stored value cards 12a, 12b, 12c, 12d on the first carrier shell 25, such as by using the card placing stations 130, 140, 150, 160 of the system 100. As described above, in one embodiment, the stored value cards 12 are stacked on one another such as to at least partially overlap the card bar code 14 of the previously placed stored value card 12, thereby constructing the card multipack 10 having a compact size. In one embodiment, the stored value cards 12 are stacked on the first carrier shell 25 and compared and verified to a predetermined sequence stored in the data file of the software system. In one embodiment, an adhesive may be dispensed onto at least one (e.g. on each one) of the stored value cards 12 such as using the adhesive dispensing device 145 described above and shown in FIG. 7, such that the stored value cards 12 are held in place in the card multipack 10. In one embodiment, the card bar codes 14 may be printed on the stored value cards 12 before the stored value cards 12 are placed in the first carrier shell 25. Further, the stored value cards 12 may be sequentially arranged in the holding rack 132 of the card placing stations 130, 140, 150, 160 according to a predetermined order (e.g., according to a desired range of values of the stored value cards 12. Alternatively, the card bar codes 14 may be read and a data file may be created in-line as the stored value cards are placed in the first carrier shell 25.

In one embodiment, the method 200 further includes a task of creating an image of each of the card bar codes 14. In one embodiment, the method 200 includes a task 230 of placing the first stored value card 12a on the first carrier shell 25, followed by a task 240 of creating an image of the first card bar code 14a. In one embodiment, the one or more cameras 172 of the first data capture station 170A are used to create one or more respective images of the first card bar code 14a of one or more of the first stored value cards 12a. However, the present invention is not limited thereto and, in other embodiments, the image may be created by any other suitable device or method. Further, in one embodiment, the method 200 includes a task 250 of placing the second stored value card 12b on the first stored value card 12a, followed by a task 260 of creating an image of the second card bar code 14b. In one embodiment, one or more cameras of the second data capture station 170B are used to create one or more respective images of the second card bar code 14b of one or more of the second stored value cards 12b. In a task 270 of the method 200, additional stored value cards 12 (e.g., the third and fourth stored value cards 12c and 12d) may be placed on the second stored value card 12b, and an image of each of the card bar codes 14 (e.g., the third and fourth card bar codes 14c and 14d) of the additional stored value cards 12 may be created.

The method 200, in one embodiment, further includes a task of comparing or verifying the card bar codes 14 with a data file associating the card bar codes 14 with the carrier bar code 26a and/or with one another. In one embodiment, the data file may be used with the software system of the computer 176 described above. That is, the method 200 may include a task 245 of verifying the first card bar code 14a with the data file after the task 240 of creating an image of the first card bar code 14a, a task 265 of verifying the second card bar code 14b with the data file after the task 260 of creating an image of the second card bar code 14b, and, similarly, the task 270 including verifying additional card bar codes (e.g., the third and fourth card bar codes 14c and 14d) after creating an image of each of the additional card bar codes. Further, according to an embodiment, the software system performs the task of verifying the card bar code of each of the stored value cards concurrently or simultaneously with the task of creating the image of each of the card bar codes.

Figure 18:
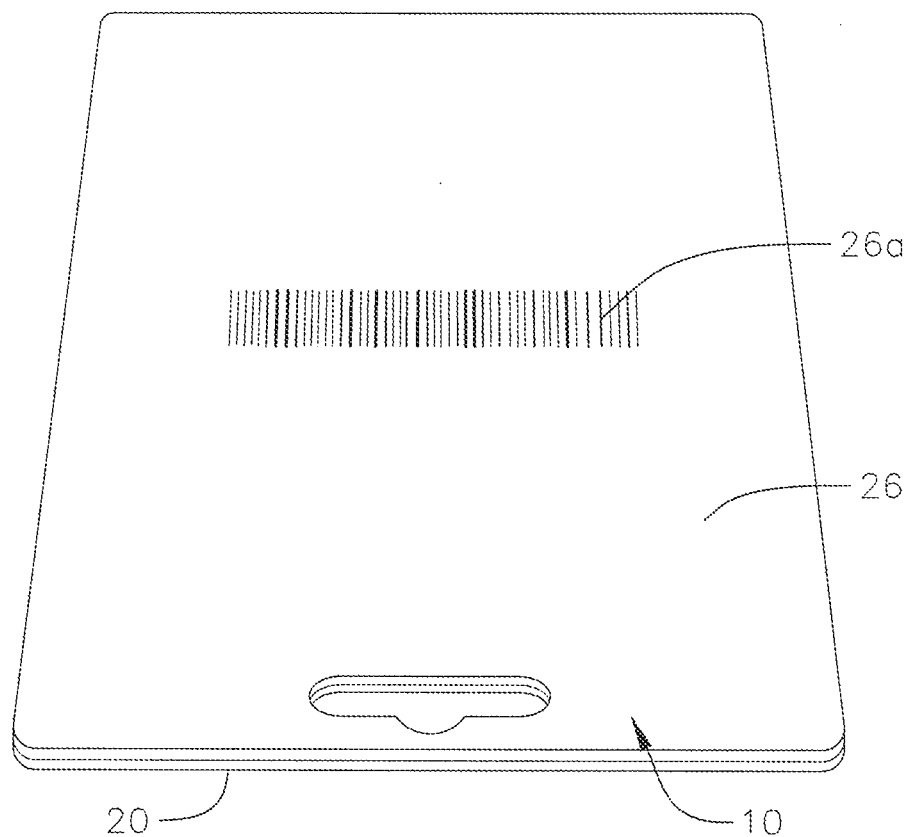
FIG. 18 is a rear perspective view of a second carrier shell of a card multipack placed over the stored value cards of FIGS. 14-17 and sealed with the carrier base and the first carrier shell.

In one embodiment, as shown in FIG. 18, the method 200 further includes a task 275 of placing the second carrier shell 26 over the stored value cards 12, such as using the third carrier placing station 180 of the system 100. In one embodiment, the second carrier shell 26 may be another paper of cardboard portion opposite the carrier base 20.

The method 200, in one embodiment, further includes a task 280 of creating an image of the carrier bar code 26a. In one embodiment, one or more cameras of the fifth data capture station 170E are used to create one or mare respective images of the carrier bar code 26a of one or more of the second carrier portions 26. The method may further include a task 285 of comparing or verifying the carrier bar code 26a with a data file associating the card bar codes 14 with the carrier bar code 26a. In an embodiment, the carrier bar code 26a may be an alphanumeric code. In one embodiment, the data file may be used with the software system of the computer 176 described above. In an embodiment, the computer 176 may provide an output, such as a warning when any of the card bar codes 14 and the carrier bar codes 26a are not verified correctly with the information in the existing data base. In one embodiment, the computer 176 may create a data file containing information of the verification of the card bar codes 14 and the carrier bar codes 26a, or a data file storing and/or associating the card bar codes 14 and the respective carrier bar codes 26a.

In another embodiment, a method of constructing a card multipack may further include a task of folding the carrier base 20, such as by using a folding station, as described in U.S. patent application Ser. No. 13/423,105, the entire content of which is incorporated by reference herein. In an embodiment, the carrier base 20 may be folded before or after the second carrier shell 26 is placed over the stored value cards 12, or, alternatively, the second carrier shell 26 may be omitted.

The method 200, in one embodiment, further includes a task 290 of sealing the card multipack 10, such as using the sealing station 190 of the system 100. The card multipack 10 is shown in FIG. 18 in a sealed state. In one embodiment, the task 290 of sealing the card multipack 10 includes applying heat and/or pressure to an outer surface of at least one of the carrier base 20 or the second carrier portion 26. An adhesive may be applied to a portion of at least one of the carrier base 20 or the second carrier portion 26 prior to being sealed. In one embodiment, after the card multipack 10 is sealed, the method includes a task of transporting the sealed card multipack 10 into the receiving bin 198, such as using the transporting station 195 of the system 100.

In one embodiment, the method 200 may further include a task of tamper-proofing the card multipack 10. For example, an apparatus (not shown) may be used for tamper-proofing a card multipack 10 that has already been sealed. Tamper-proofing may include modifying the sealed card multipack 10 such that the card multipack 10 cannot be opened without visible damage, for example. In another embodiment, an apparatus may be used for sealing and tamper-proofing a card multipack 10.

While in one embodiment, the method 200 of constructing a card multipack may include each of the tasks described above and shown in FIG. 11, in other embodiments of the present invention, in a method of constructing a card multipack, one or more of the tasks described above and shown in FIG. 11 may be absent and/or additional tasks may be performed. Further, in the method 200 of constructing a card multipack according to one embodiment, the tasks may be performed in the order depicted in FIG. 11. However, the present invention is not limited thereto and, in a method of constructing a card multipack according to other embodiments of the present invention, the tasks described above and shown in FIG. 11 may be performed in any other suitable sequence.

Figure 19:
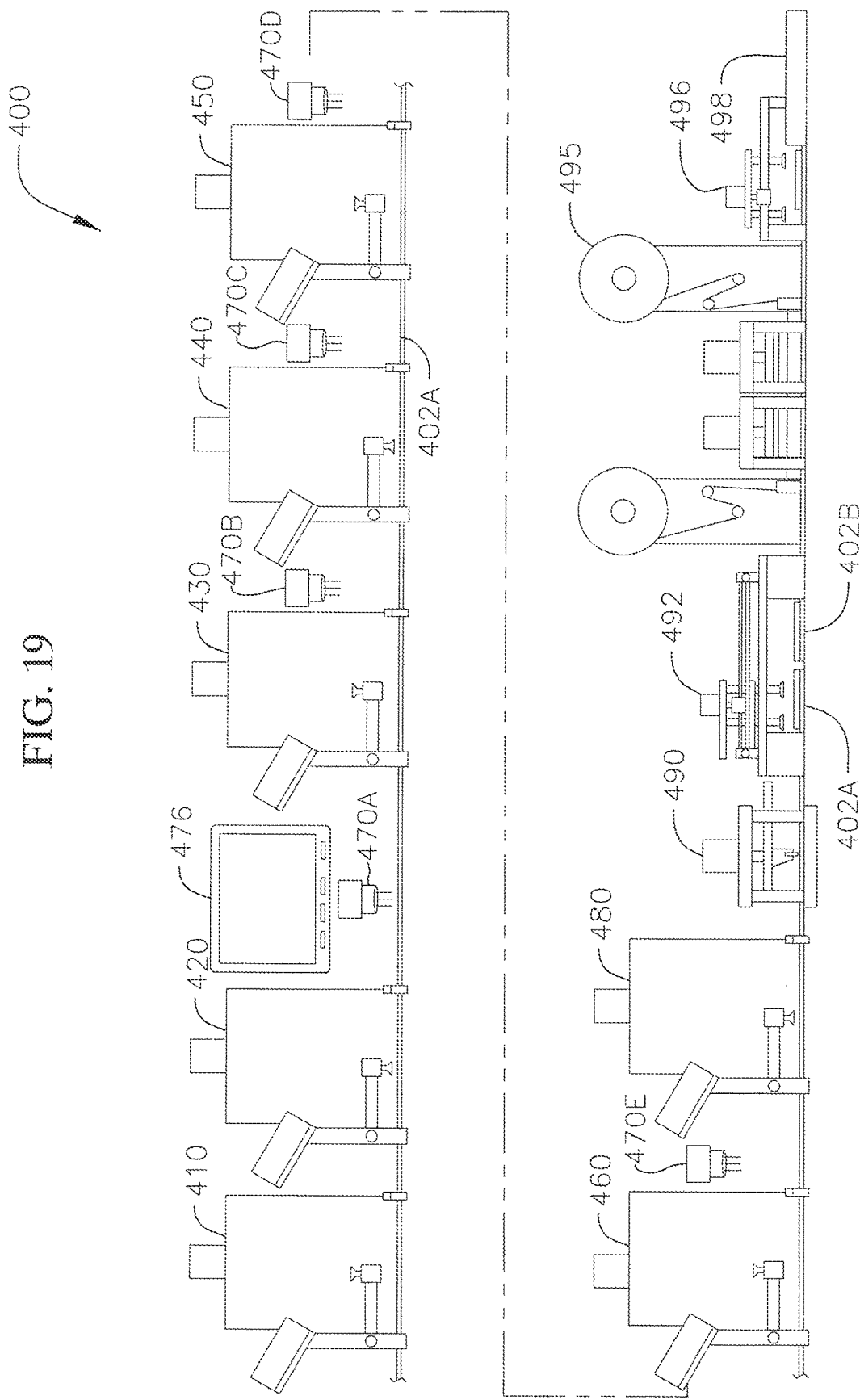
FIG. 19 is a schematic diagram of an automated system for constructing card multipacks according to another embodiment of the present invention.

With reference to FIG. 19, an automated system 400 for constructing card multipacks according to another embodiment of the present invention includes a movable conveyor including a first conveyor 402A and a second conveyor 402B, a first carrier placing station 410, a first card placing station 420, a second card placing station 430, a third card placing station 440, a fourth card placing station 450, a second carrier placing station 460, a data capture station 470A, a third carrier placing station 480, a first sealing station 490, a first transporting station 492, and a second sealing station 495. In one embodiment, the data capture station 470A is a first data capture station, and the system 400 further includes a second data capture station 470B, a third data capture station 470C, a fourth data capture station 470D, and a fifth data capture station 470E. The system 400, according to an embodiment, further includes a computer 476 and an associated software system. In one embodiment, the system further includes a second transporting station 496 configured to move the sealed card multi ticks to a receiving bin 498. The conveyor, in one embodiment, is movable between each of the stations and devices shown and described above. Further, in one embodiment, each of the first conveyor 402A and the second conveyor 402B may be configured similarly to the conveyor 102 described above including a pair of chains and a plurality of tooling plates but, alternatively, may include a belt or any other movable conveying device known in the art.

While the automated system 400 shown in FIG. 19 including each of the stations and devices described above is one embodiment of the present invention, the present invention is not limited thereto. For example, in other embodiments, one or more of the stations or devices of the automated system 400 shown in FIG. 19 may be absent and/or additional stations or devices may be added. For example, in one alternative embodiment, the automated system may have any other desired number of card placing stations rather than four. Also, in constructing a particular card multipack, such as the card multipack shown in FIG. 23 including three stored value cards, one or more of the stations (e.g., one or more of the card placing stations) of the system 400 may not be utilized. Further, while in one embodiment of the present invention, the stations and devices of the system 400 shown in FIG. 19 are arranged in the sequence shown relative to one another, the present invention is not limited thereto. That is, the stations and devices of the system 400 may be arranged in any other suitable sequence relative to one another.

With reference to FIG. 19, the first, second, and third carrier placing stations 410, 460, 480 may be configured the same or similarly as the first, second, and third carrier placing stations 110, 120, 180 of the system 100 described above, and, similarly, the first, second, third, and fourth card placing stations 420, 430, 440, 450 may be configured the same or similarly as the first, second, third, and fourth card placing stations 130, 140, 150, 160 of the system 100 described above. Therefore, further description of these components of the system 400 will not be provided. Also, the system 400 may include one or more adhesive dispensing devices similar to the adhesive dispensing devices 145 described above and configured to dispense adhesive on one or more of the stored value cards or carrier portions of the constructed card multipack.

Figure 23:
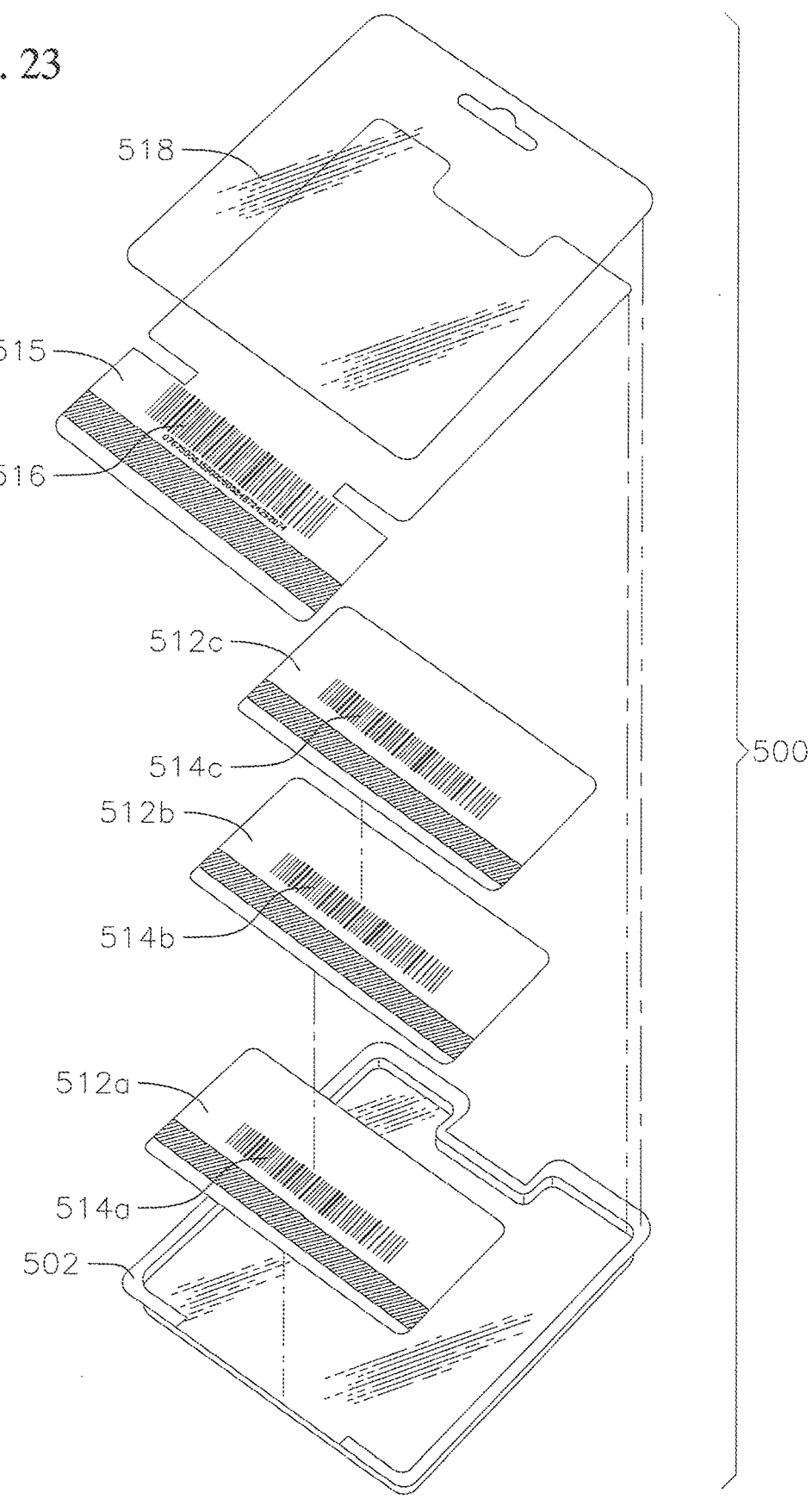
FIG. 23 is an exploded rear view of a card multipack constructed using the automated system for constructing card multipacks of FIG. 19, according to an embodiment of the present invention.

Each of the first to fourth data capture stations 470A, 470B, 470C, 470D, according to an embodiment, includes one or more cameras, such as the cameras 172 described above and configured to create an image of one or more card bar codes 514a, 514b, 514c of one or more stored value cards 512a, 512b, 512c of a card multipack 500 (see FIG. 23). In one embodiment, each of the first to fourth data capture stations 470A, 470B, 470C, 470D further includes at least one illuminating device (not shown), such as an LED flash, configured to provide illumination on the card bar codes 514a, 514b, 514c when the camera captures the image thereof. The fifth data capture station 470E may be configured the same or similarly as the first to fourth data capture stations 470A, 470B, 470C, 470D and is located for capturing an image of a carrier bar code 516 of the card multipack 500. In one embodiment, the first data capture station 470A is configured to read the first card bar code 514a of the first stored value card 512a at a location between the first card placing station 420 and the second card placing station 430 before the second stored value card 512b is placed on the first stored value card 512a, the second data capture station 470B is configured to read the second card bar code 514b of the second stored value card 512b at a location between the second card placing station 430 and the third card placing station 440 before the third stored value card 512c is placed on the second stored value card 512b, the third data capture station 470C is configured to read the third card bar code 514c of the third stored value card 512c at a location between the third card placing station 440 and the fourth card placing station 450 before a fourth stored value card is placed on the third stored value card 512c, the fourth data capture station 470D is configured to read a fourth card bar code of the fourth stored value card at a location between the fourth card placing station 450 and the second carrier placing station 460 before the second carrier portion 515 is placed over the fourth stored value card, and the fifth data capture station 470E is configured to read the carrier bar code 516 at a location after the second carrier portion 515 has been placed by the second carrier placing station 460.

The system 400, in one embodiment, further includes the computer 476 similar to the computer 176 described above and including a software system adapted to compare and verify each of the card bar codes 514a, 514b, 514c with those of a data file associating, or linking, each of the card bar codes 514a, 514b, 514c with the carrier bar code 516 and/or with the other card bar codes 514a, 514b, 514c of the respective card multipack 500. In one embodiment, the data file associating, or linking, each of the card bar codes 514a, 514b, 514c is preexisting, and the system 400 compares and verifies the card bar codes 514a, 514b, 514c in-line after each of the respective stored value cards 512a, 512b, 512c is placed. In another embodiment, the software system creates the data file in-line and creates in the data file an association between each of the card bar codes 514a, 514b, 514c with the carrier bar code 516 and/or with the other card bar codes 514a, 514b, 514c of the respective card multipack 500. The software system, in one embodiment, verifies the card bar codes 514a, 514b, 514c with the data file using the image created by the respective cameras of the data capture stations.

Figure 20:
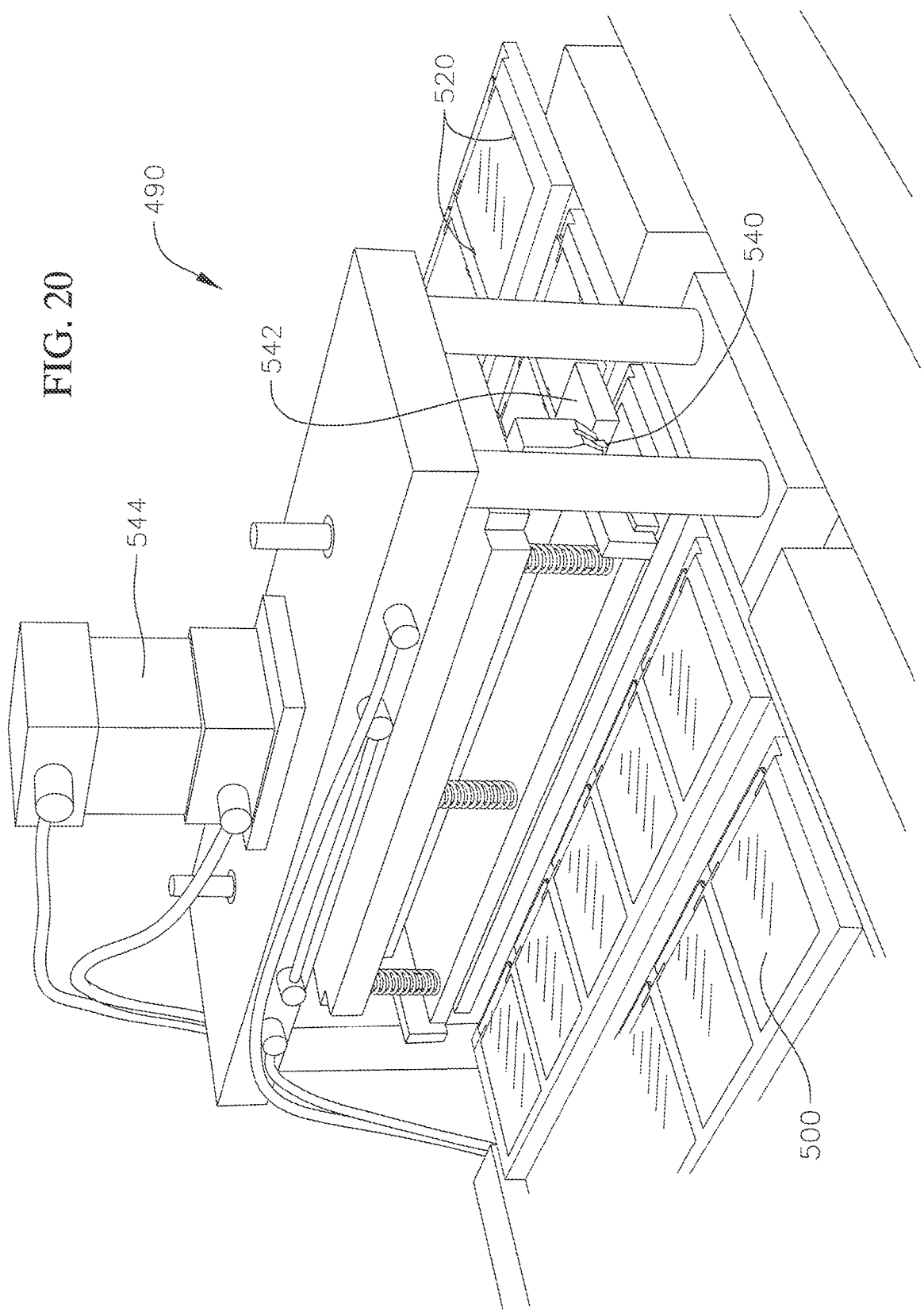
FIG. 20 is a front schematic view of a first sealing station of the automated system for constructing card multipacks of FIG. 19, according to an embodiment of the present invention.

With reference to FIG. 20, the first sealing station 490, in one embodiment, is configured to weld a region of a first carrier shell of the card multipack 500, which may be made of plastic, to a region of a second carrier shell of the card multipack 500, which may be made of plastic. In an embodiment, the welded region may include a pair of welded regions 520 at opposite sides of the card multipack 500 to maintain the card multipack 500 in an assembled state until final sealing at the second sealing station 495. In an embodiment, the first sealing station 490 includes a welding portion 540 configured to weld the first and second carrier shells together to form the welded regions 520. In an embodiment, the first sealing station 490 further include plates 542 at opposite sides of the welding portion 540 that are configured to press and maintain the card multipack 500 in position during the welding process. The first sealing station 490 may further include one or more devices such as a hydraulic pump 544 configured to move at least one of the welding portion 540 and the plates 542 downward.

Figure 21:
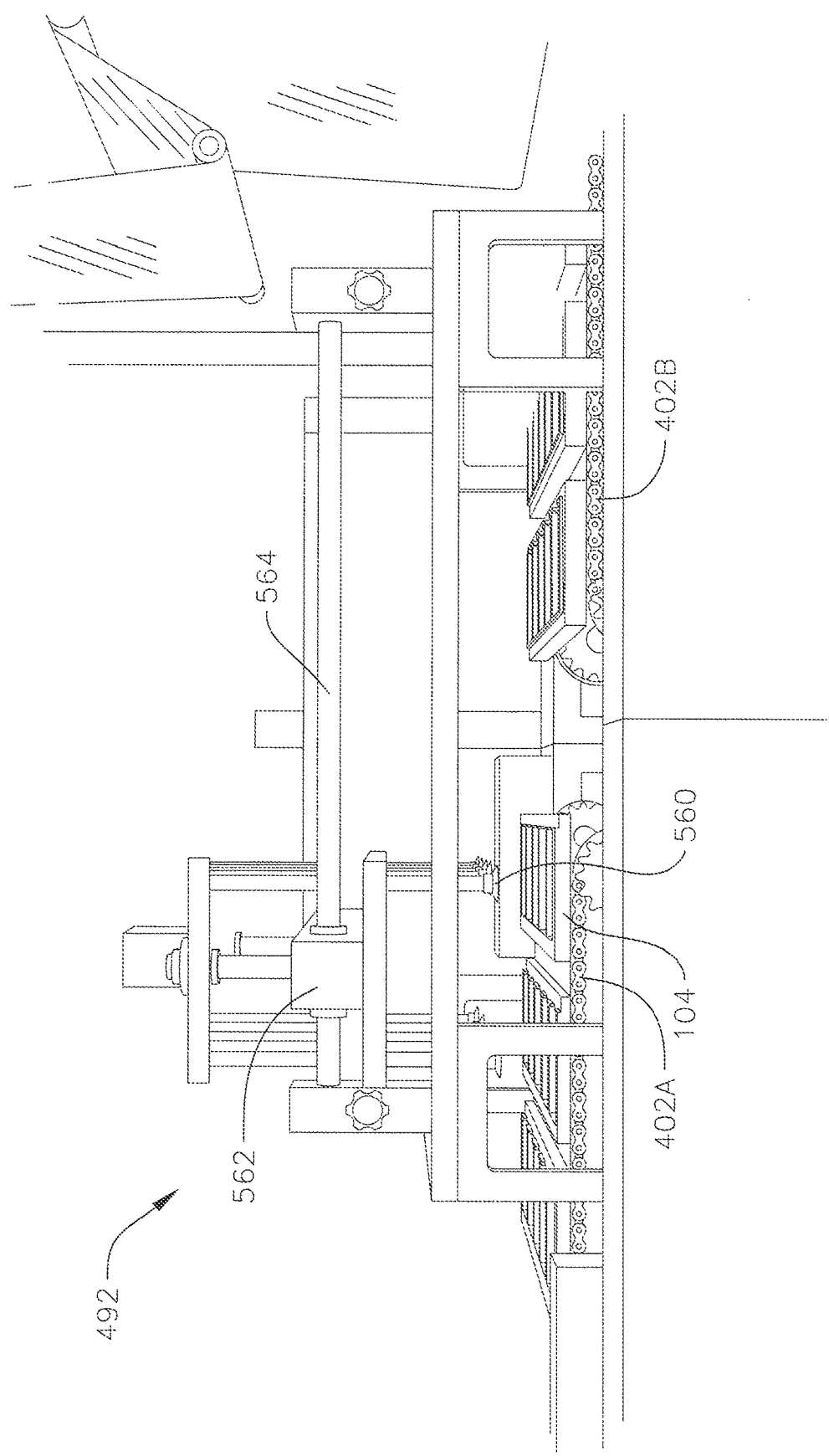
FIG. 21 is a front schematic view of a first transporting station of the automated system for constructing card multipacks of FIG. 19, according to an embodiment of the present invention.

With reference to FIG. 21, the first transporting station 492, in one embodiment, is configured similarly to the transporting station 195 described above and is configured to transport the card multipacks 500 having the welded portions 520 from the first conveyor 402A to the second conveyor 402B. In one embodiment, the first transporting station 492 includes one or more holding mechanisms 560 each configured to grab one of the card multipacks 500 having the welded portions 520 from the first conveyor 402A and place the card multipack 500 on the second conveyor 402B. In one embodiment, the holding mechanisms 560 are connected to vacuum or suction lines, wherein suction is applied from a suction-generating device (e.g., a vacuum pump) for grabbing and holding the card multipack 500 and is released for placing the card multipack 500 on the second conveyor 402B. Further, in one embodiment, the holding mechanisms 560 are coupled to an arm 562 that is movable along a rail 564 in both a direction toward the second conveyor 402B and back toward the first conveyor 402A.

Figure 22:
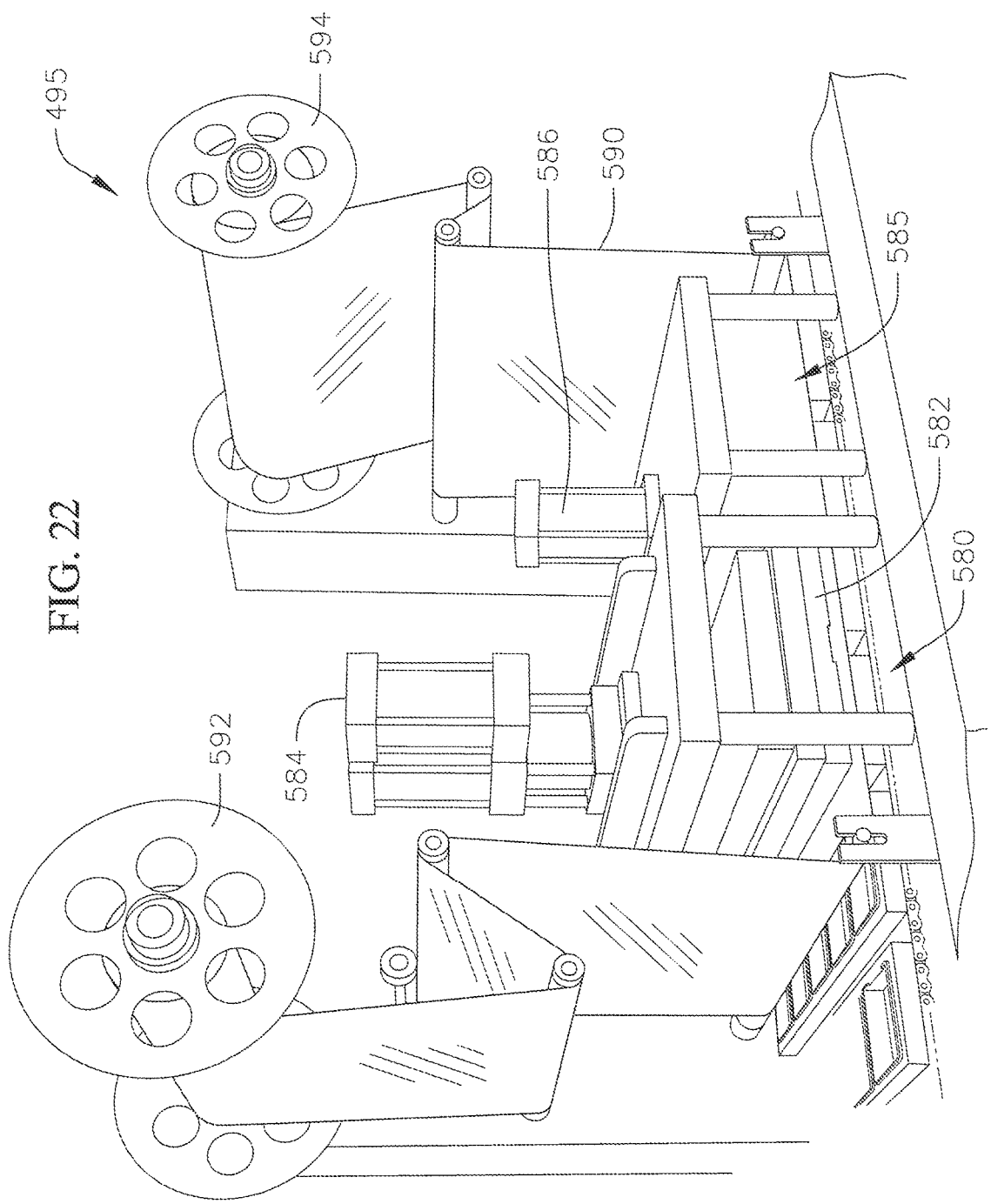
FIG. 22 is a front schematic view of a second sealing station of the automated system for constructing card multipacks of FIG. 19, according to an embodiment of the present invention.

With reference to FIG. 22, the second sealing station 495, in one embodiment, is configured to seal by heating or melting (e.g., around a perimeter) the first carrier shell of the card multipack 500, which may be made of plastic, to the second carrier shell of the card multipack 500, which may be made of plastic. In an embodiment, the second sealing station 495 includes a heating device 580 including a heat plate 582 configured to press and heat or melt the first and second carrier shells together (e.g., around perimeters thereof) to seal the card multipack 500. In an embodiment, the second sealing station 495 further includes a cooling device 585 located after the sealing device 580 and including a cooling plate, for example, configured to cool the sealed card multipack 500. The second sealing station 495 may further include a protective sheet 590, such as a polytetrafluoroethylene (PTFE) sheet, to prevent the second carrier shell from adhering to the heat plate 582 or the cooling plate 585. In an embodiment, the protective sheet 590 is moved between a supply roll 592 and a winding roll 594 while the second conveyor 402B is moved. The second sealing station 495 may further include one or more devices such as hydraulic pumps 584 and 586 configured to move the heat plate 582 and the cooling plate of the cooling device 585 downward. In an embodiment, the second transporting station 496 and the receiving bin 498 may be configured the same or similarly as the transporting station 195 and the receiving bin 198 of the system 100 described above, and, therefore, further description of these components will not be provided.

With reference to FIG. 23, the card multipack 500 according to an embodiment of the present invention is shown. The card multipack 500, for example, may be constructed using the automated system 400 described above. The card multipack 500 contains one or more of the stored value cards 512*a*, 512*b*, 512*c* each having one of the card bar codes 514*a*, 514*b*, 514*c*. In one embodiment, the card multipack 500 includes a first carrier shell 502 on which the stored value cards 512*a*, 512*b*, 512*c* are sequentially placed. The card multipack 500 further includes a carrier insert 515 placed over the stored value cards 512*a*, 512*b*, 512*c* and having the carrier bar code 516 on a surface which, in one embodiment, faces a same direction as surfaces of the stored value cards 512*a*, 512*b*, 512*c* having the card bar codes 514*a*, 514*b*, 514*c* and in which the image of the carrier bar code 516 may be captured by the fifth data capture station 470E. The carrier bar code 516 is readable, or scannable, and is located on an exterior of the card multipack 500 after the card multipack 500 has been sealed. In one embodiment the card multipack 500 further includes a second carrier shell 518 placed over the carrier insert 515 and which may be sealed together with the first carrier shell 502. In an embodiment, the stored value cards 512*a*, 512*b*, 512*c* may be placed, or stacked, on one another in the card multipack 500 in an overlapping manner such as to at least partially cover the respective card bar code 514*a*, 514*b* of the one or more overlapped stored value cards 512*a*, 512*b*. As such, the card multipack 500 may have a compact size. In an embodiment, the respective card bar code 514*a*, 514*b* of each of the one or more overlapped stored value cards 512*a*, 512*b* is read by one of the data capture stations prior to a subsequent one of the stored value cards 512*b*, 512*c* being placed. Also, although FIG. 23 shows three cards in the card multipack 500, the number of stored value cards in each card multipack is not limited to any particular number, and the number of cards in each card multipack may be four, five, or ten, for example.

With reference to FIG. 24, a method 600 of constructing a card multipack is shown. The method 600, in one embodiment, may be performed in constructing the card multipack 500 using the system 400 for constructing card multipacks described above and shown in FIG. 19. However, in other embodiments, the method 600, or at least some of the tasks thereof, may be performed in constructing card multipacks according to other embodiments of the present invention and/or using an automated system or apparatus for constructing card multipacks according to other embodiments of the present invention.

The method 600 includes a task 610 of placing the first carrier shell 502 of the card multipack 500 on the first conveyor 402A, such as by using the first carrier placing station 410. In one embodiment, the first carrier shell 502 may be a clam shell.

The method 600 further includes a task of placing one or more of the stored value cards 512*a*, 512*b*, 512*c* on the first carrier shell 502, such as by using one or more of the card placing stations 420, 430, 440, 450. In one embodiment, an adhesive may be dispensed onto at least one of the stored value cards 512*a*, 512*b*, 512*c*, such as by using an adhesive dispensing device. As described above, in one embodiment, the stored value cards 512*a*, 512*b*, 512*c* are stacked on one another such as to at least partially overlap the card bar code 514*a*, 514*b* of the previously placed stored value card 512*a*, 512*b*, thereby constructing the card multipack 500 having a compact size. In one embodiment, the stored value cards 512*a*, 512*b*, 512*c* are stacked on the first carrier shell 502 and compared and verified to a predetermined sequence stored in the data file of the software system. In one embodiment, an adhesive may be dispensed onto at least one (e.g., on each one) of the stored value cards 512*a*, 512*b*, 512*c*, such that the stored value cards 512*a*, 512*b*, 512*c* are held in place in the card multipack 500. In one embodiment, the card bar codes 514*a*, 514*b*, 514*c* may be printed on the stored value cards 512*a*, 512*b*, 512*c* before the stored value cards 512*a*, 512*b*, 512*c* are placed in the first carrier shell 502. Further, the stored value cards 512*a*, 512*b*, 512*c* may be sequentially arranged in the holding rack of each of the respective card placing stations according to a predetermined order (e.g., according to a desired range of values of the stored value cards 512*a*, 512*b*, 512*c*.

In one embodiment, the method 600 further includes a task of creating an image of each of the card bar codes 514*a*, 514*b*, 514*c*. In one embodiment, the method 200 includes a task 620 of placing the first stored value card 512*a* on the first carrier shell 502, followed by a task 630 of creating an image of the first card bar code 514*a*. In one embodiment, the one or more cameras of the first data capture station 470A are used to create one or more respective images of the first card bar code 514*a* of one or more of the first stored value cards 512*a*. However, the present invention is not limited thereto and, in other embodiments, the image may be created by any other suitable device or method. In one embodiment, the method 600 includes a task 640 of placing the second stored value card 512*b* on the first stored value card 512*a*, followed by a task 650 of creating an image of the second card bar code 514*b*. In one embodiment, one or more cameras of the second data capture station 470B are used to create one or more respective images of the second card bar code 514*b* of one or more of the second stored value cards 512*b*. In a task 660 of the method 600, additional stored value cards (e.g., the third stored value card 512*c* and a fourth stored value card) may be placed on the second stored value card 512*b*, and an image of each of the card bar codes (e.g., the third card bar code 514*c* and a fourth card bar code) of the additional stored value cards may be created.

The method 600, in one embodiment, further includes a task of comparing or verifying the card bar codes 514*a*, 514*b*, 514*c* with a data file associating the card bar codes 514*a*, 514*b*, 514*c* with the carrier bar code 516 and/or with one another. In one embodiment, the data file may be used with the software system of the computer 476 described above. That is, the method 600 may include a task 635 of verifying the first card bar code 514*a* with the data file after the task 630 of creating an image of the first card bar code 514*a*, a task 655 of verifying the second card bar code 514*b* with the data file after the task 650 of creating an image of the second card bar code 514b, and, similarly, the task 660 including verifying additional card bar codes (e.g., the third card bar code 514c and a fourth card bar code) after creating an image of each of the additional card bar codes. Further, according to an embodiment, the software system performs the task of verifying the card bar code of each of the stored value cards concurrently or simultaneously with the task of creating the image of each of the card bar codes.

The method 600 further includes a task 665 of placing the carrier insert 515 of the card multipack 500 on the stored value cards 512a, 512b, 512c, such as by using the second carrier placing station 460. In one embodiment, the carrier bar code 516 may be printed on the carrier insert 515 before the carrier insert 515 is placed on the stored value cards 512. In one embodiment, the carrier insert 515 may be a parent carrier.

The method 600, in one embodiment, further includes a task 670 of creating an image of the carrier bar code 516. In one embodiment, one or more cameras of the fifth data capture station 470E are used to create one or more respective images of the carrier bar code 516 of one or more of the carrier inserts 515. The method may further include a task 675 of comparing or verifying the carrier bar code 516 with a data file associating the card bar codes 514a, 514b, 514c with the carrier bar code 516. In an embodiment, the carrier bar code 516 may be an alphanumeric code. In one embodiment, the data file may be used with the software system of the computer 476 described above. In an embodiment, the computer 476 may provide an output, such as a warning when any of the card bar codes 514, 514b, 514c and the carrier bar codes 516 are not verified correctly with the information in the existing data base. In one embodiment, the computer 476 may create a data file containing information of the verification of the card bar codes 514a, 514b, 514c and the carrier bar codes 516, or a data file storing and/or associating the card bar codes 514a, 514b, 514c and the respective carrier bar codes 516.

The method 600 of constructing a card multipack, according to one embodiment, further includes a task 680 of placing the second carrier shell 518 over the carrier insert 515, such as by using the third carrier placing station 480, and a task 690 of sealing, the card multipack 500, such as using the first and second sealing stations 490, 495. In one embodiment, the second carrier shell 518 may be a clam shell. In one embodiment, the task 690 of sealing the card multipack 500 includes applying heat and/or pressure to an outer surface of at least one of the first carrier shell 502 or the second carrier shell 518. The task 690 may include first welding regions of the first and second carrier shells 502, 518, such as using the first sealing station 490, and subsequently sealing the first and second carrier shells 502, 518 about a perimeter thereof, such as using the second sealing station 495. That is, the first and second clam shells 502, 518 may be melted, or heat sealed, together using the second sealing station 495. In one embodiment, after the card multipack 500 is sealed, the method includes a task of transporting the sealed card multipack 500 into the receiving bin 498, such as using the second transporting station 495 of the system 400. In another embodiment, the method 600 may further include a task of tamper-proofing the card multipack 500, such as described above with respect to the method 200.

Although the drawings illustrate the invention as applied to an automated system for constructing card multipacks containing stored value cards, it will be apparent that the novel aspects of the automated system and method of the invention may also be applied to other applications. For example, aspects of embodiments of an automated system and method described herein may be applied to an automated system for constructing packages containing other cards or other items. Further, it will be apparent to those skilled in the art that an automated system for constructing card multipacks may incorporate or embody various combinations of the embodiments described above with respect to the shapes, sizes, and components of the systems and apparatuses, as well as alternatives not described herein, without departing from the spirit and scope of the present invention. Also, while the invention has been described and shown herein with respect to several structures of card multipacks and carriers thereof, the present invention is not limited thereto. That is, in other embodiments, the stored value cards may be contained in any other suitable carrier. For example, in another embodiment of an automated system according to the present invention, a large number of stored value cards may be packaged in a carrier that is a box or other suitable container, such as using a shuffle feeder. For example, the box or other container may have a parent bar code that is associated with child bar codes of the stored value cards, or the box may have a window through which a parent bar code of one of the stored value cards may be associated with child bar codes of other ones of the stored value cards, and which may be verified using the automated system according to an embodiment of the present invention. Further, the number of stored value cards in the multipack is not limited by the present invention. Further, in other embodiments of the present invention, data acquisition or capturing is not limited to bar codes or cameras, but, rather, may be performed by any other suitable device, such as via magnetic stripes and magnetic stripe readers. Similarly, in other embodiments of the present invention, the bar codes of one or both of the stored value cards or the carriers may be substituted with magnetic stripes or any other suitable readable data device.

The preceding description has been presented with reference to some exemplary embodiments of the invention. Persons skilled in the art and technology to which this invention pertains will appreciate that alterations and changes in the described structures and methods of assembly and operation can be practiced without meaningfully departing from the principles, spirit, and scope of this invention.

What is claimed is:

1. An automated system for constructing card multipacks, the automated system comprising:
   a movable conveyor comprising a plurality of tooling plates, each configured to receive a height adjusting member on an upper surface thereof;
   a first carrier placing station configured to place a first carrier portion of a carrier on a tooling plate of the plurality of tooling plates;
   a first card placing station configured to place a first stored value card on the first carrier portion;
   a first data capture station configured to read a first card bar code of the first stored value card and create a data file in-line in the automated system, the data file comprising an association between at least the first card bar code and a carrier bar code; and
   a software system adapted to verify the first card bar code with the data file, wherein the height adjusting member is configured to support the first carrier portion thereon.

2. The automated system of claim 1, wherein the first data capture station comprises a first camera configured to create a first image of the first card bar code, and the software system is adapted to verify the first card bar code using the first image.

3. The automated system of claim 2, further comprising a second carrier placing station between the first data capture station and a sealing station configured to seal the carrier, the second carrier placing station configured to place a second carrier portion of the carrier on the first stored value card subsequent to the first data capture station reading the first card bar code, wherein the second carrier portion comprises the carrier bar code.

4. The automated system of claim 3, further comprising a second data capture station between the second carrier placing station and the sealing station, the second data capture station comprising a second camera configured to create a second image of the carrier bar code, and the software system is adapted to verify the carrier bar code using the second image.

5. The automated system of claim 4, wherein the first card bar code comprises a parent card bar code, and the data file further comprises an association between the parent card bar code and the carrier bar code.

6. The automated system of claim 5, wherein the first data capture station is configured to read the first card bar code between the first card placing station and the sealing station, and the second data capture station is configured to read the carrier bar code between the second carrier placing station and the sealing station.

7. The automated system of claim 6, wherein the software system is adapted to verify the first card bar code and the carrier bar code in-line in the automated system and provide an output before the sealing station seals the carrier.

8. The automated system of claim 7, wherein the output comprises a warning that the first card bar code or the carrier bar code was not verified by the software system.

9. The automated system of claim 8, wherein the sealing station does not seal the carrier when an output comprising a warning is provided.

10. The automated system of claim 7, wherein after verifying the carrier bar code, the first card bar code comprising the parent card bar code, or a combination thereof, each stored value card within the carrier is activated by the parent card bar code after the sealing station seals the carrier.

11. The automated system of claim 10, wherein the parent card bar code is readable through a window of the first carrier portion or the second carrier portion after the carrier has been sealed.

12. A method for constructing card multipacks using an automated system, the method comprising:
placing a first carrier portion of a carrier on a conveyor of the automated system using a first carrier placing station of the automated system, the conveyor including a plurality of tooling plates, each configured to receive a height adjusting member on an upper surface thereof, wherein the height adjusting member is configured to support the first carrier portion thereon;
placing a first stored value card on the first carrier portion using a first card placing station of the automated system;
reading a first card bar code of the first stored value card in-line using a first data capture station of the automated system; and
verifying the first card bar code with a data file using a software system of the automated system, the data file comprising an association between at least the first card bar code and a carrier bar code.

13. The method of claim 12, wherein the first card bar code comprises a parent card bar code, and the data file further comprises an association between the parent card bar code and the carrier bar code.

14. The method of claim 13, wherein reading the first card bar code comprises creating a first image of the first card bar code using a first camera, and the software system is adapted to verify the first card bar code using the first image.

15. The method of claim 14, further comprising:
placing a second carrier portion of the carrier on the first stored value card using a second carrier placing station of the automated system subsequent to reading the first card bar code, the second carrier portion comprising the carrier bar code;
reading the carrier bar code of the second carrier portion in-line using a second data capture station of the automated system, wherein reading the carrier bar code comprises creating a second image of the carrier bar code using a second camera; and
verifying the carrier bar code using the second image.

16. The method of claim 15, further comprising sealing the carrier in-line using the automated system after the carrier bar code, the first card bar code comprising the parent card bar code, or a combination thereof is verified.

17. The method of claim 16, further comprising activating each stored value card within the carrier using the parent card bar code, after the carrier is sealed.

18. The method of claim 15, further comprising providing an output before sealing the carrier in-line using the automated system.

19. The method of claim 18, wherein the output comprises a warning that the first card bar code or the carrier bar code was not verified by the software system.

20. The method of claim 19, further comprising not sealing the carrier in-line using the automated system when an output comprising a warning is provided.

* * * * *